US007689837B2

(12) United States Patent
Taguchi et al.

(10) Patent No.: US 7,689,837 B2
(45) Date of Patent: Mar. 30, 2010

(54) STORAGE SYSTEM, DATA MIGRATION METHOD AND MANAGEMENT COMPUTER

(75) Inventors: Yuichi Taguchi, Sagamihara (JP); Fumi Miyazaki, Kawasaki (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1063 days.

(21) Appl. No.: 11/134,348

(22) Filed: May 23, 2005

(65) Prior Publication Data

US 2006/0182281 A1   Aug. 17, 2006

(30) Foreign Application Priority Data

Feb. 16, 2005   (JP) ............................. 2005-039826

(51) Int. Cl.
*G06F 21/00* (2006.01)
(52) U.S. Cl. .................. 713/193; 713/150; 713/189; 380/28; 380/270; 711/161; 711/162
(58) Field of Classification Search ................ 713/150, 713/189, 193; 380/28, 270; 711/161, 162
See application file for complete search history.

(56) References Cited

U.S. PATENT DOCUMENTS

| | | | | |
|---|---|---|---|---|
| 6,397,307 | B2 * | 5/2002 | Ohran | 711/161 |
| 7,107,463 | B2 * | 9/2006 | England et al. | 713/193 |
| 7,162,503 | B2 * | 1/2007 | Oeda | 707/203 |
| 7,197,518 | B2 * | 3/2007 | Fisher et al. | 707/202 |
| 7,225,191 | B1 * | 5/2007 | Black | 707/100 |
| 7,254,672 | B1 * | 8/2007 | Murray et al. | 711/112 |
| 7,356,707 | B2 * | 4/2008 | Foster et al. | 713/189 |
| 2002/0107018 | A1 * | 8/2002 | Nakamura et al. | 455/433 |
| 2003/0037247 | A1 | 2/2003 | Obara et al. | |
| 2003/0115225 | A1 * | 6/2003 | Suzuki et al. | 707/204 |
| 2003/0221077 | A1 | 11/2003 | Ohno et al. | |

(Continued)

FOREIGN PATENT DOCUMENTS

JP   2001-331380   11/2001

(Continued)

OTHER PUBLICATIONS

Thomas C. Jepsen; "The Basics of Reliable Distributed Storage Networks"; IT Pro May / Jun. 2004; pp. 18-24.*

(Continued)

*Primary Examiner*—Carl Colin
(74) *Attorney, Agent, or Firm*—Brundidge & Stanger, P.C.

(57) ABSTRACT

At the time of migrating encrypted data into another storage apparatus, decrypt this data after migration is simplified, and security against tapping, falsification and the like is maintained when a calculation method of encrypted data is re-written into another calculation method, and also access performance is improved. In a storage system 100 which is provided with a storage apparatus having a volume 120 and which is accessible from a host computer, it is made possible to execute the data migration when a storage apparatus provided with a mechanism capable of decrypting the encrypted data is chosen as a migration destination of this data, and also to keep holding surely the encrypted data by updating and saving again an encryption method applied to a encryption of the encrypted data into another method by internal processing of the apparatus even when the apparatus and the encryption method become obsolete.

15 Claims, 26 Drawing Sheets

U.S. PATENT DOCUMENTS

2004/0153642 A1    8/2004    Plotkin et al.
2005/0071577 A1*    3/2005    Dias et al. .................. 711/151

FOREIGN PATENT DOCUMENTS

JP      2002-351747      12/2002
JP      2004-5370      1/2004

OTHER PUBLICATIONS

Yongdae Kim et al; "Secure Group Key Management for Storage Area Networks"; IEEE Communications Magazine o Aug. 2003; pp. 92-99.*

* cited by examiner

FIG. 7

| Data I/O Network I/F Identification Information | Logical Storage Extent Identification Information | Logical Storage Extent Capacity (dB) | Virtual Storage Extent Judgment Information | Virtual Storage Extent Apparatus Identification Information | VirtualLogical Storage Extent Identification Information |
|---|---|---|---|---|---|
| 0 | 00:01 | 20 | 0 | null | null |
| 0 | 00:02 | 20 | 0 | null | null |
| 0 | 00:0A | 50 | 1 | 50:00:01:1E:0A:E8:02 | 04:01 |
| 1 | 01:01 | 10 | 0 | null | null |
| 2 | 01:0E | 5 | 1 | 50:00:01:1E:0A:E8:02 | 04:1B |
| ... | ... | ... | ... | ... | ... |

FIG. 8

| Program Identification Information | Install Data Information |
|---|---|
| First Encryption Algorithm | 1998.01.01 |
| ... | ... |

FIG. 9

| Apparatus Identification Information (31021) | Encryption Method Identification Information (31022) | Encryption Information (31023) |
|---|---|---|
| 50:00:01: E8:A0:C3:B0 | First Encryption Algorithm | 1998.01.01 |
| 50:00:01:1E:0A:E8:02 | Second Encryption Algorithm | 1997.10.31 |
| | First Encryption Algorithm | 2005.01.01 |
| 50:00:02:1E:0A:C2:DB | First Encryption Algorithm | 1998.01.01 |
| ... | | ... |

| Apparatus Identification Information (31055) | Logical Storage Extent Identification Information (31051) | Encryption Method Identification Information (31052) | Encryption Key Information (31053) | Access Control Information (31054) |
|---|---|---|---|---|
| 50:00:01:E8:A0:C3:B0 | 00:01 | First Encryption Algorithm | 0xEF71 | [ACL0001] |
| 50:00:01:E8:A0:C3:B0 | 00:02 | First Encryption Algorithm | 0xE72A | [ACL0002] |
| ... | | | ... | ... |

| Apparatus Identification Information | Data Network I/O Identification Information | Logical Storage Extent Identification Information | Logical Storage Extent Capacity (GB) | Virtual Storage Extent Judgement Information | Virtual Storage Extent Apparatus Identification Information | Virtual Logical Storage Extent Identification Information |
|---|---|---|---|---|---|---|
| 50:00:01:E8:A0:C3:B0 | 0 | 00:01 | 20 | 0 | null | null |
| 50:00:01:E8:A0:C3:B0 | 0 | 00:02 | 20 | 0 | null | null |
| 50:00:01:E8:A0:C3:B0 | 0 | 00:0A | 50 | 1 | 50:00:01:1E:0A:E8:02 | 04:01 |
| 50:00:01:1E:0A:E8:02 | 1 | 01:01 | 10 | 0 | null | null |
| 50:00:01:1E:0A:E8:02 | 2 | 01:0E | 5 | 1 | 50:00:01:1E:0A:E8:02 | 04:1BB |
| 50:00:01:1E:0A:E8:02 | 0 | 05:01 | 20 | 1 | 50:00:01:E8:A0:C3:B0 | 00:01 |
| 50:00:01:1E:0A:E8:02 | 0 | 05:02 | 20 | 0 | null | null |
|  | 0 | 06:01 | 25 | 0 | null | null |
| ... | ... | ... |  | ... | ... | ... |

FIG. 12

| | First Encryption Algorithm | Second Encryption Algorithm | Third Encryption Algorithm | Fourth Encryption Algorithm |
|---|---|---|---|---|
| First Encryption Algorithm | — | 1 | 1 | 0 |
| Second Encryption Algorithm | 0 | — | 0 | 0 |
| Third Encryption Algorithm | 1 | 0 | — | 0 |
| Fourth Encryption Algorithm | 0 | 0 | 0 | — |

| Apparatus Identification Information | Magnetic Tape Identification Information | Encryption Method Identification Information | Encryption Key Information | Access Control Information |
|---|---|---|---|---|
| 30:00:12:C0:0A:1C:32 | Label_0001 | First Encryption Algorithm | 0xEF71 | [ACL0001] |
| 30:00:12:C0:0A:1C:32 | Label_0002 | First Encryption Algorithm | 0xE72A | [ACL0002] |
| ... | ... | ... | ... | ... |

US 7,689,837 B2

STORAGE SYSTEM, DATA MIGRATION METHOD AND MANAGEMENT COMPUTER

BACKGROUND

The present invention relates to a storage system in which it is possible to access a storage apparatus from a computer, and more particularly to a migration method of encrypted data and a management computer to perform management thereof.

First, a storage extent (volume) network which has been used from the past is explained.

A network which connects one or more external storage apparatuses and one or more computers is called a storage extent network (SAN) (for example, refer to Published Japanese Patent Application No. 2004-005370). This SAN has a characteristic of excellent scalability since a storage capacity and a computer can be easily added and deleted at a later date, though the SAN is often used especially when a plurality of computers share one large-scale storage apparatus.

Next, management of encrypted data in the storage extent network is explained.

There is a technology which is to prepare for tapping and falsification from the outside by encrypting data stored on a storage apparatus. There is a technology in which an encryption apparatus is installed in SAN, for example, and encryption and decryption are performed by having data once pass through this encryption apparatus at the time of input and output the data from a host computer to a storage system (refer to U.S. Patent Application Publication No. 2004/153642A1).

Published Japanese Patent Application No. 2001-331380 discloses a technology in which encrypted data is saved and the encrypted data is decrypted appropriately when an apparatus of a receiving side receives the encrypted data at the time of performing a data copy between storage systems using a remote copy technology. Also, an encryption processor is installed on the storage system as shown in FIG. 5 so that the encryption and decryption of data can be performed on this apparatus.

In addition, Published Japanese Patent Application No. 2002-351747 discloses a method of encrypting a storage extent and saving in another storage extent in order to back up the storage extent within a disk array apparatus (equivalent to a logical storage extent of the present invention) into a tape drive. Furthermore, a method of decrypting the storage extent storing encrypted data and saving in another storage extent is also disclosed.

Next, management of a virtual storage extent of encrypted data is explained.

With respect to this virtual storage extent management technology a detailed explanation is described in Published Japanese Patent Application No. 2004-005370, and therefore only a mechanism of a system in which a virtual storage extent technology is installed is briefly described herein.

FIG. 2 is a diagram showing a configuration example of a virtual storage extent management system. In FIG. 2, a storage system 101, a storage system 102 and a host computer 200 are connected by a network connection apparatus 400 comprising a data I/O network 401. The network connection apparatus 400 mounts a plurality of data I/O network interfaces 440, and respective data I/O network interfaces 440 are connected with a data I/O network interface 240 which is mounted on the host computer 200 and a data I/O network interface 140 which is mounted on the storage system 101 and the storage system 102 through a data I/O network 402.

The above is a physical network configuration of the system in which the virtual storage extent technology is installed. On the other hand, it is assumed as a logical configuration of the network connection apparatus 400 that a communication path 411 is provided between the data I/O interfaces 440 which are connected with the host computer 200 and the storage system 101, and similarly a communication path 412 is provided between the data I/O interfaces 440 which are connected with the storage system 101 and the storage system 102. Mutual communications between the host computer 200 and the storage system 101, and also between the storage system 101 and the storage system 102 becomes possible by the logical network configuration described hereinabove.

It should be noted that the storage system 101 and the storage system 102 may be connected directly by the data I/O network 402 without passing through the network connection apparatus 400.

A configuration and an input/output procedure of a virtual storage extent (volume) 121 provided in this storage system 101 is described hereinafter.

The virtual storage extent 121 is created in the storage system 101, and is configured such that this virtual storage extent 121 is associated with a logical storage extent 120 which is mounted on the storage system 102. Storage extent configuration information, in which a relation of this association is written, is saved in storage extent configuration information 1107 held in the storage system 101. Further, in this configuration, the host computer 200 transmits a data input/output command making the virtual storage extent 121 which is mounted on the storage system 101 as a target. When the storage system 101 receives this data input/output command, a virtual storage extent management program 1106 refers to the storage extent configuration information 1107 to understand that a destination of the commanded data input/output is the virtual storage extent 121. Next, the storage system 101 transfers the data input/output command received from the host computer 200 making the logical storage extent 120, which is associated with this virtual storage extent and is mounted on the storage system 102, as a target. The storage system 102 executes the commanded data input/output to the logical storage extent 120 when this data input/output command is received.

However, there exist following problems in the prior-art technologies described hereinbefore.

More specifically, a first problem is that in a state where a storage system has a function to encrypt data to be stored and also stores data encrypted by this function, and at the time of migrating this encrypted data into another storage system when removing an apparatus thereof, for example, it has been necessary to choose an storage system apparatus having a function capable of decrypting and encrypting this encrypted data as a migration destination. In addition, it has been difficult to choose an appropriate apparatus as the migration destination because there has been no means for managing compatibility among a plurality of encryption methods and a mounting situation thereof. Due to this reason, there has occurred such a risk that the data can not be decrypted after transfer when an apparatus having a compatible encryption function mounted is not chosen as the migration destination.

Also, a second problem is that in a situation where a storage system stores encrypted data, it has been necessary in the past to have such a procedure that decrypted data is once read in a host computer and the data is written into another storage system having another encryption method after the data is encrypted again by this method in order to update an encryption method of this data into another encryption method. However, there has been a risk of tapping and falsification in this method since plaintext data once flows on a network and is processed by the host computer.

Moreover, it has been necessary to perform load-imposing and time-consuming processing such as migration processing on the network and computation processing by the host computer.

In addition, a third problem is that in a situation where encrypted data is stored on a storage system, there has been such a problem that it becomes not possible to decrypt this data when an encryption function and an apparatus necessary for decrypting this data is removed.

It should be noted that the invention described in Published Japanese Patent Application No. 2001-331380 is not for an object of saving encrypted data which is an object of the present invention but focuses on an object of realizing how to decrypt efficiently encrypted data to read out to a host. Explaining further details, the storage system in Published Japanese Patent Application No. 2001-331380 is not aiming at decrypting and storing the data to be saved on a disk drive like the present invention but Published Japanese Patent Application No. 2001-331380 is the one describing the opposite operation, more specifically how to decrypt at the time of saving the encrypted data (refer to Published Japanese Patent Application No. 2001-331380).

SUMMARY

Accordingly, the present invention has an object of providing with a storage system, a data migration method and a management computer which enable to realize efficient decryption and read-out to a host at the time of migrating encrypted data stored on a storage apparatus of a storage system into another storage apparatus.

In order to solve the first problem described hereinbefore and to achieve the object of the present invention, the present invention is provided with a management computer to manage a configuration of a storage system which has encrypted data and an encryption function. Further, at the time of migrating the encrypted data, the management computer chooses a storage system which has an encryption function compatible with a migration source as a migration destination based on the encryption method to the encrypted data.

In addition, the storage system of the present invention is made such that two or more encryption functions can be mounted in order to solve the second problem. Further, in case that this encryption method migrates the encrypted data within the same storage system, there is provided with a mechanism to perform update processing for changing over encryption methods by processing within an apparatus of the same storage system when data encrypted by a certain encryption method is updated into data encrypted by another encryption method.

Moreover, according to the present invention, in order to solve the third problem it is possible for a management computer to delete an encryption function and to remove an apparatus when an encryption method is not used and under this situation, it becomes possible to urge an interruption of the removal and to perform processing of updating into another encryption method before removal when there exists encrypted data.

According to the present invention, three effects described hereinafter can be obtained.

The first effect is that even in case of migrating data into another apparatus due to a reason that a product warranty period of an apparatus has passed and this apparatus becomes obsolete under a situation where encrypted data is stored on a storage system, it is possible to choose correctly an apparatus mounting a function capable of decrypting this data as an apparatus of a migration destination thereof. It is possible to avoid such a risk that encrypted data can not be decrypted at the migration destination since a management computer manages the compatibility of encryption method and an apparatus having a compatible function of the encryption method mounted on the apparatus of the migration source is chosen as the migration destination.

The second effect is that it is possible to perform update processing within the same storage system without passing through a host computer even when the encryption method becomes obsolete and it is tried to update into another encryption method under the situation where the encrypted data is stored on the storage system. In addition, although the encrypted data is once decrypted after loading into a cache memory within the storage system and is written in a storage extent after encrypting again by another encryption method during the update processing, plaintext data does not flow on a network, which is different from a method of passing through the host computer. More specifically, it is possible to eliminate a risk of tapping and falsification since the update processing is completed within the storage system.

Moreover, it is not necessary to keep separately cache data for decryption and cache data for encryption, which is different from the method of passing through the host computer, since decryption processing and encryption processing are performed directly to the data read in the cache memory during the update processing. As a result, it is possible to obtain such an effect that consumption of the cache memory can be restrained.

Furthermore, it is also possible to obtain such an effect that a processing speed improves since there is neither time consumed nor a load imposed due to data migration on the network and computation on the host computer by performing the update processing within the storage system, which is different from the method of passing through the host computer.

The third effect is that it is possible to avoid a problem caused by the uninstall or removal of the function and the apparatus required for decrypting the encrypted data under the situation where the encrypted data is stored. More specifically, since the management computer judges at the time of removing the function and the apparatus required for the above-described decryption so that a warning can be given and the update into another encryption method can be performed when there exists the encrypted data required at the time of decryption, it is possible to eliminate such a risk that the encrypted data can not be decrypted after removal.

BRIEF DESCRIPTION OF THE DRAWINGS

FIG. 7 is an implementation example of storage extent configuration information held in the storage system according to the present invention;

FIG. 8 is an implementation example of program management information held in the storage system according to the present invention;

FIG. 9 is an implementation example of asset management information held in the management computer according to the present invention;

FIG. 10 is an implementation example of data encryption management information held in the management computer according to the present invention;

FIG. 11 is an implementation example of storage extent configuration information held in the management computer according to the present invention;

FIG. 12 is an implementation example of encryption method compatibility information held in the management computer according to the present invention;

FIG. 28 is an implementation example of data encryption management information held in a management computer according to the present invention.

DESCRIPTION OF THE PREFERRED EMBODIMENTS

Hereinafter, an embodiment of the present invention is explained in detail referring to the accompanied drawings. It should be noted that the present invention is obviously not limited to the embodiment explained hereinafter.

Figure 1:
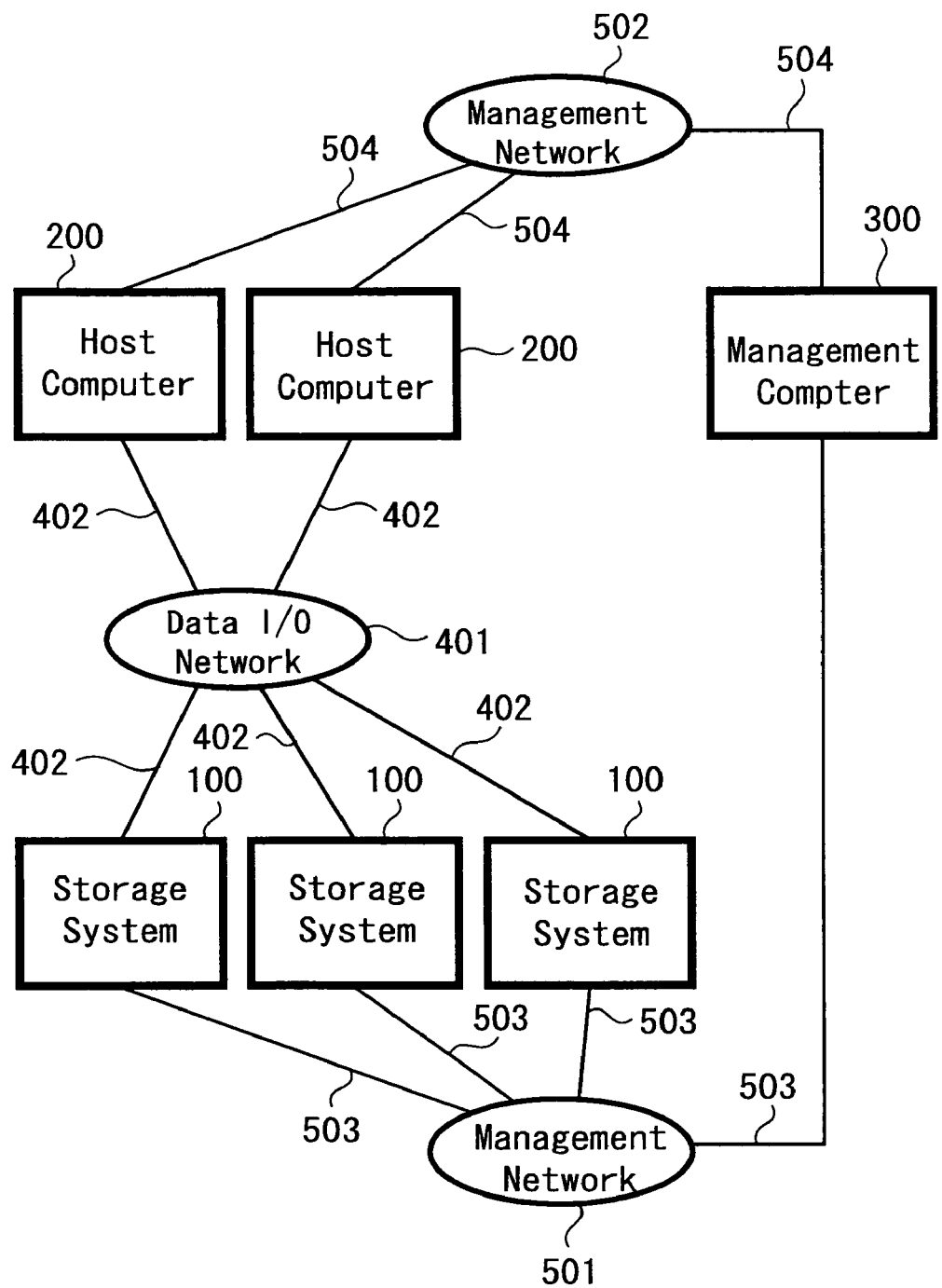
FIG. 1 is an outline diagram showing a configuration example of a network according to the present invention.

A configuration example of a network according to an embodiment of the present invention is shown in FIG. 1. A host computer 200 is connected to a storage system 100 through a data I/O network 401. The storage system 100 and the data I/O network 401, and also the host computer 200 and the data I/O network 401 are connected by a data I/O network 402. The data I/O network 401 may be comprised of a prior-art network connection apparatus such as Fiber channel and Ethernet (registered trademark), for example. The data I/O network 402 may use an optical fiber cable or an Ethernet (registered trademark) cable, for example, depending on a type of the data I/O network 401. The host computer 200 and the storage system 100 are in a state of being capable of performing communications mutually by the network configuration explained hereinabove. Moreover, two or more storage systems 100 are in a state of being capable of performing communications mutually through the data I/O network 401.

A management computer 300 is connected to the storage system 100 through a management network 501. In addition, the management computer 300 is connected to the host computer 200 through another management network 502. Similarly to the data I/O network 401, the management network 501 and the management network 502 are ones which are formed by implementing a prior-art communication technology. In another form of implementation, the management network 501 and the management network 502 may be such a form that one single network is shared instead of being the independent ones respectively. In furthermore another form of implementation, the management network 501, the management network 502 and the data I/O network 401 may be such a form that one single network is shared instead of being the independent ones. The management computer 300 and the storage system 100, and also the management computer 300 and the host computer 200 are connected to be in a state of being capable of performing communications mutually by the above-described configuration.

Figure 3:
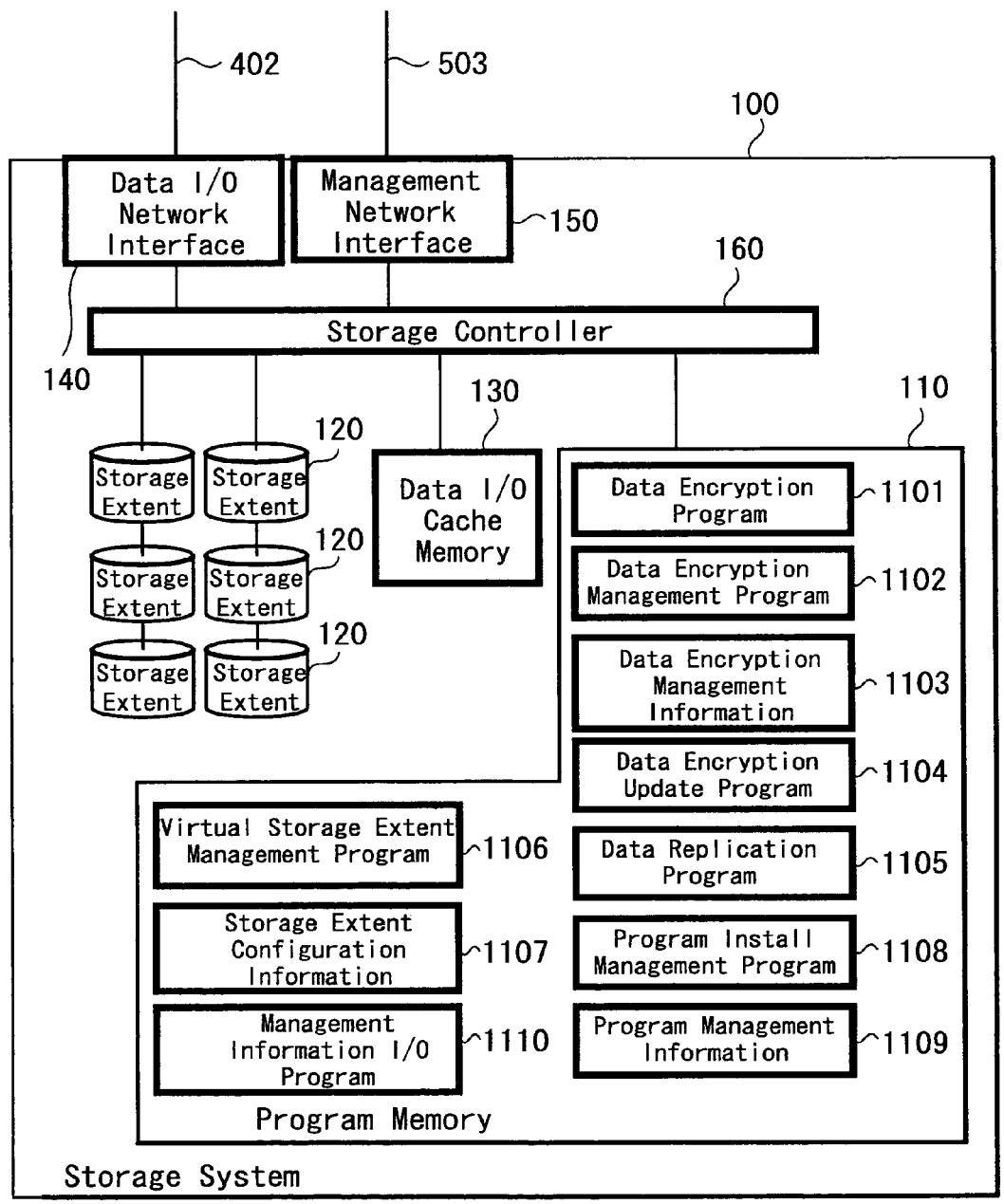
FIG. 3 is a configuration example of a storage system according to the present invention.

FIG. 3 shows a configuration example of the storage system 100. The storage system 100 is configured to have the data I/O network interface 140 for performing data input/output which is connected with the data I/O network 401, a management network interface 150 for input/output management information which is connected with the management network 501, a storage controller 160 for performing control within the storage system, a program memory 110 that is a memory to store programs required for operation of the storage system 100, the logical storage extent 120 that is a storage extent storing data to be input/output by the host computer 200 and a data I/O cache memory 130 that is a temporary memory for performing input/output of the logical storage extent 120, which are mutually connected through the storage controller 160.

The data I/O network interface 140 and the management network interface 150 may be implemented using a network I/O apparatus of prior-art communication technology such as Fiber channel and Ethernet (registered trademark). It should be noted that the number of data I/O network interfaces 140 and the number of management network interfaces 150 can be any number in the present invention. In addition, the management network interface 150 may be such a form that the data I/O network interface 140 is shared for management instead of being the independent one.

The logical storage extent 120 is one which re-configures a storage device such as a magnetic disk and an optical medium, a non-volatile memory or a volatile memory, into a logical unit for providing to the host computer 200. It should be noted that the number and capacity of logical storage extents 120 can be any number and capacity in the present invention.

Although it is general to implement the data I/O cache memory 130 using a volatile memory, a magnetic disk may be used as a substitute. It should be noted that the capacity of the data I/O cache memory may be any capacity in the present invention.

The program memory 110 is a memory space implemented using a magnetic disk and a volatile semiconductor memory, and is used for a purpose of holding basic programs and information required for operation of the storage system 100. Stored in the program memory 110 are a data encryption program 1101 for encrypting input data and decrypting output data, a data encryption management program 1102 for managing encrypted data, data encryption management information 1103, a data encryption update program 1104 for controlling a function to update an encryption method of encrypted data into another encryption method, a data replication program 1105 for replicating data stored on a logical storage extent 120 into another logical storage extent, a virtual storage extent management program 1106 for behaving to the host computer 200 as if a logical storage extent 120 mounted on another storage system 100 were mounted within the apparatus, storage extent configuration information 1107 that is configuration information of the logical storage extent 120, a program install management program 1108 for managing install, update and deletion of a program to this storage system 100, program management information 1109, and a management information I/O program 1110 for input and output management information between management computers 300.

Figure 2:
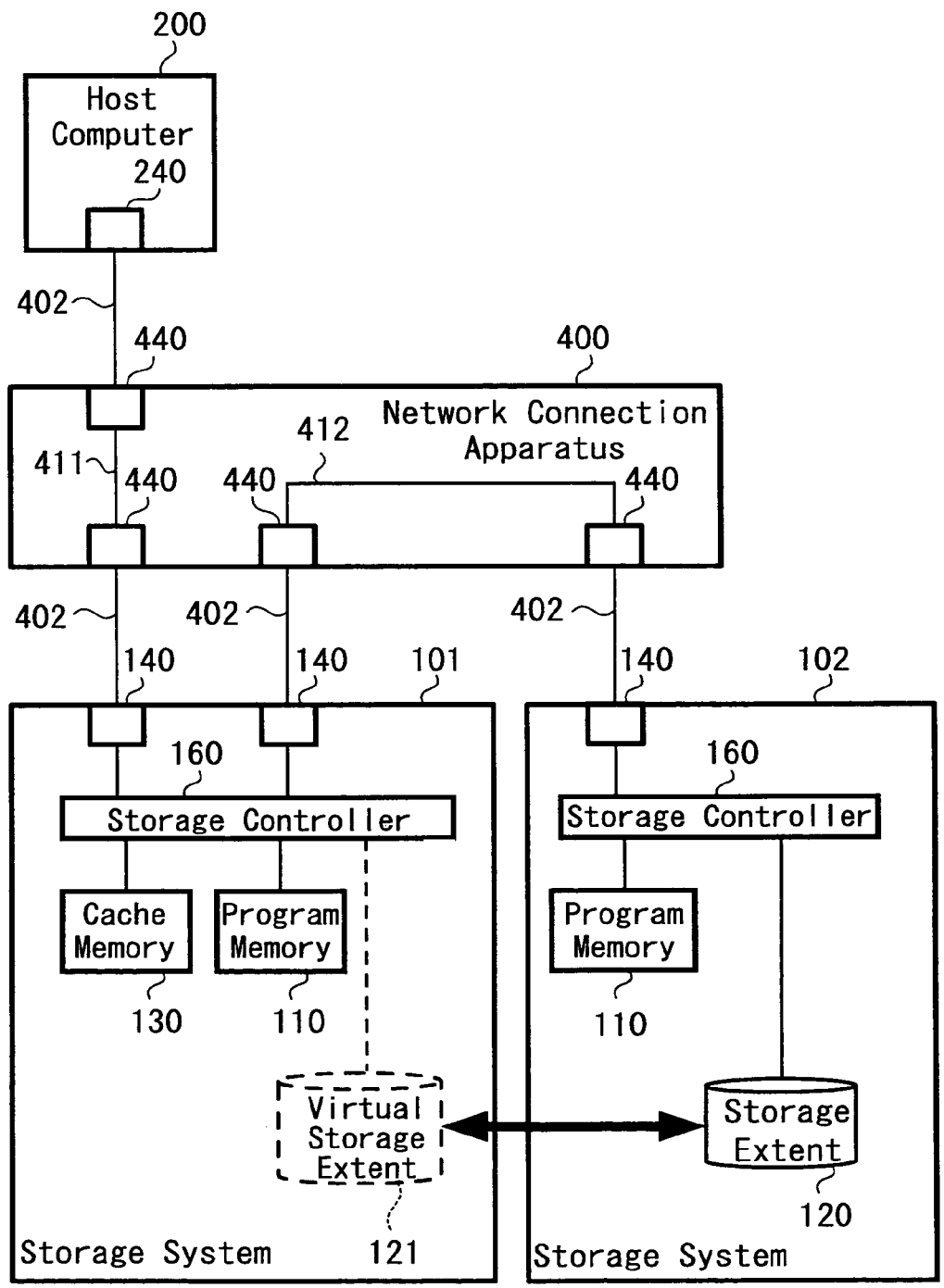
FIG. 2 is a configuration example of a virtual storage extent management system according to the present invention.

Herein, the virtual storage extent means one which corresponds to the virtual storage extent shown in FIG. 2. Therefore, when this virtual storage extent is used, the host computer 200 recognizes only the virtual storage extent for the storage system 100 and is to make access to the virtual storage extent. Further, the storage system 100 is to execute access to the logical storage extent associated with the virtual storage extent. Hereinafter, a virtual storage extent shown in FIG. 7 described later is also similar. It should be noted that the virtual storage extent and the logical storage extent associated with the virtual storage extent may be provided over different storage systems 100, or within the same storage system 100, and furthermore over different storage apparatuses or in the same storage apparatus within the same storage system 100.

Figure 4:
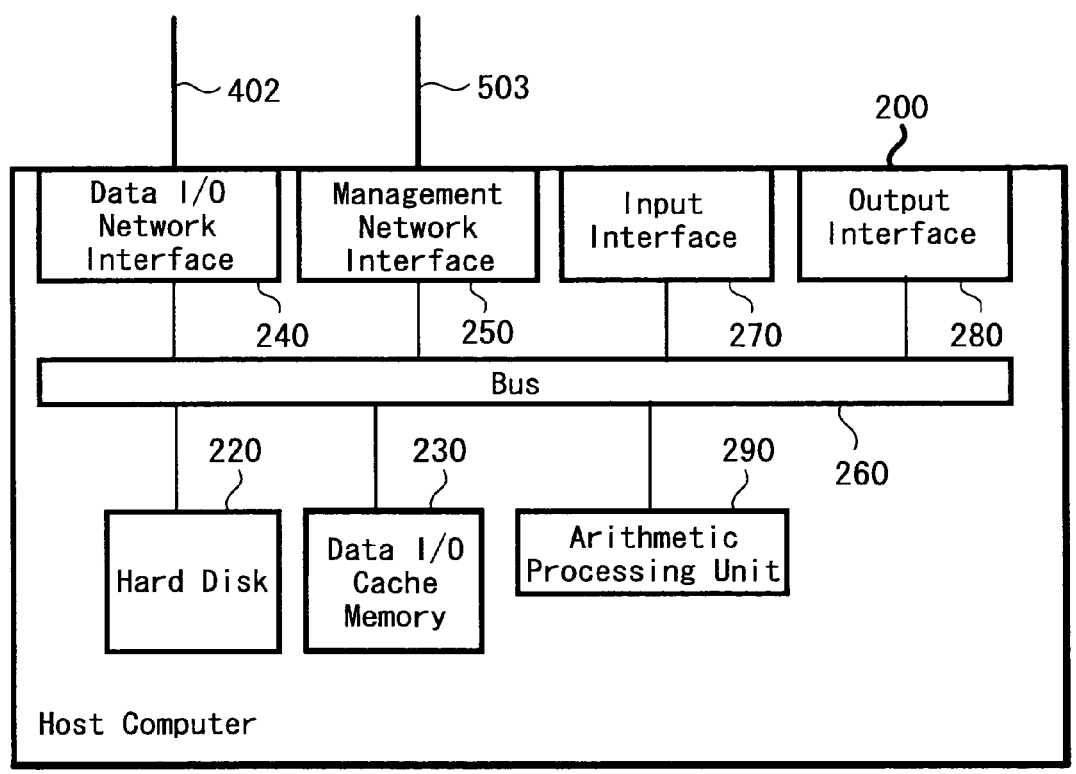
FIG. 4 is a configuration example of a host computer according to the present invention.

FIG. 4 is a diagram showing a configuration example of the host computer 200. The host computer 200 is configured to have a data I/O network interface 240 for performing data input/output which is connected to the data I/O network 401, a management network interface 250 for input/output management information which is connected to the management network 502, an input interface 270 for an operator to input information such as a keyboard and a mouse for example, an output interface 280 for output information to an operator such as a general-purpose display for example, an arithmetic processing unit 290 equivalent to CPU for performing various calculations, a hard disk 220 implemented using a magnetic disk, and a data I/O cache memory 230 implemented generally using a volatile memory, which are mutually connected by a communication bus 260. The data I/O network interface 240 and the management network interface 250 can be implemented using a network I/O apparatus of prior-art communication technology such as Fiber channel and Ethernet (registered trademark). It should be noted that the number of data I/O network interfaces 240 and the number of management network interfaces 250 may be any number in the present invention. In addition, the management network interface 250 may be such a form that the data I/O network interface 240 is shared for management instead of being the independent one.

The host computer 200 is configured similarly to a prior-art general-purpose computer (PC) as described hereinbefore. In addition, the host computer 200 operates an operating system and also operates application programs such as a data base and an accounting program on the operating system similarly to the general-purpose computer. These application programs perform input/output of data to the logical storage extent 120 mounted on the storage system 100 and update data stored on the logical storage extent 120.

Figure 5:
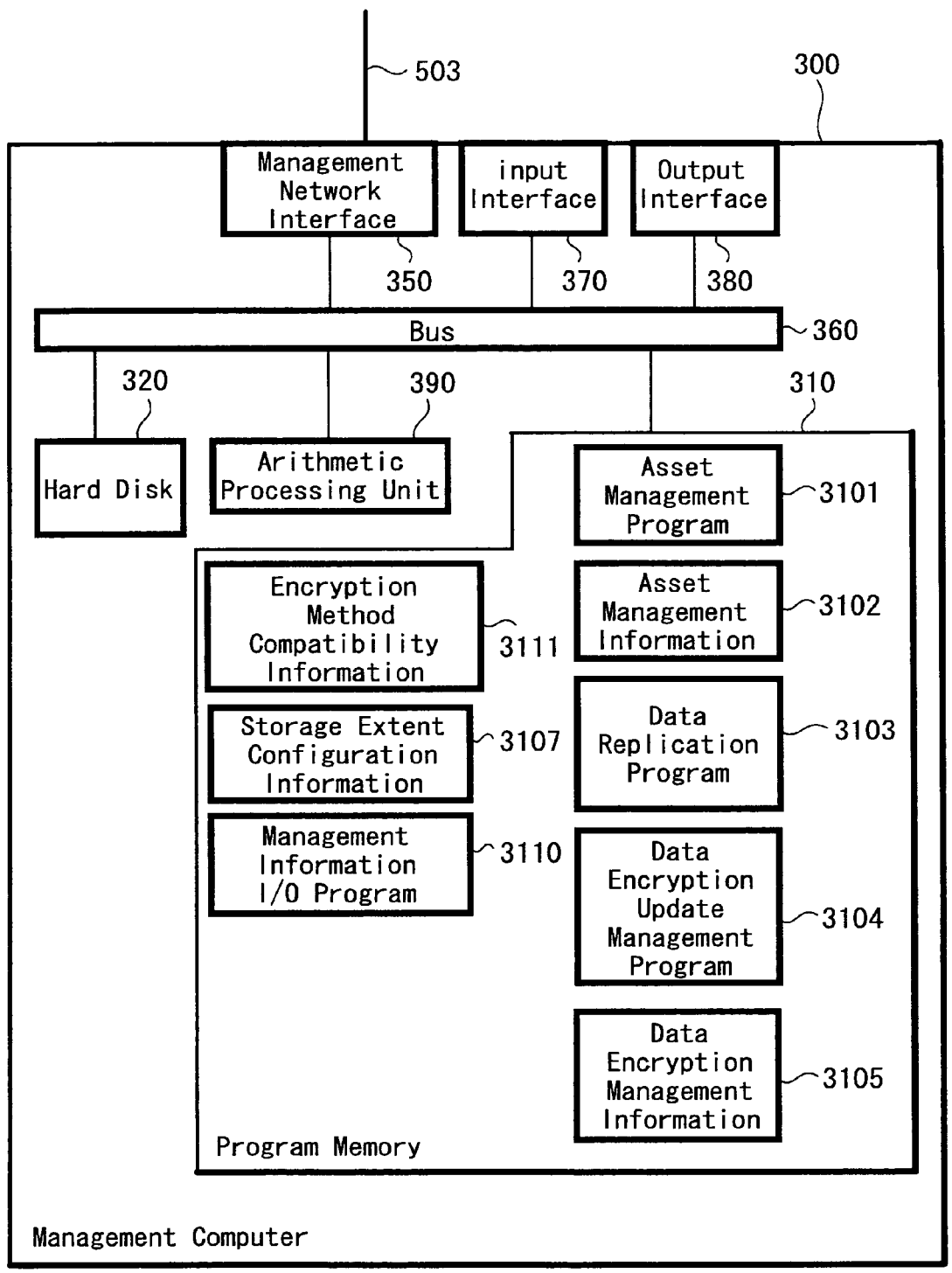
FIG. 5 is a configuration example of a management computer according to the present invention.

FIG. 5 shows a configuration example of the management computer 300. The management computer 300 is configured to have a management network interface 350 for input and output management information, an input interface 370 for an operator to input information such as a keyboard and a mouse for example, an output interface 380 for output information to an operator such as a general-purpose display for example, an arithmetic processing unit 390 which is equivalent to a CPU for performing various calculations, a hard disk 320 implemented using a magnetic disk, and a program memory 310 that is a storage extent for storing programs required for operation of the management computer 300, which are connected mutually by a communication bus 360, and the management computer 300 is connected to the management network 501 and the management network 502.

The program memory 310 is a memory space implemented using a magnetic disk and a volatile memory, and is used for a purpose of holding basic programs and information required for operation of the management computer 300. Stored in the program memory 310 are an asset management program 3101 for managing a program configuration of the storage system 100 connected to the system, asset management information 3102, a data replication program 3103 for giving a command of data replication between the logical storage extent 120, a data encryption update management program 3104 for issuing a command to update an encryption method of encrypted data to another encryption method, data encryption management information 3105 for managing encrypted data, storage extent configuration information 3107 that is configuration information of the logical storage extent 120 mounted on one or more storage systems 100, a management information I/O program 3110 for input/output management information between the management computers 300, and encryption method compatibility information 3111 recording compatibility between encryption programs 1101 described hereinbefore.

Figure 6:
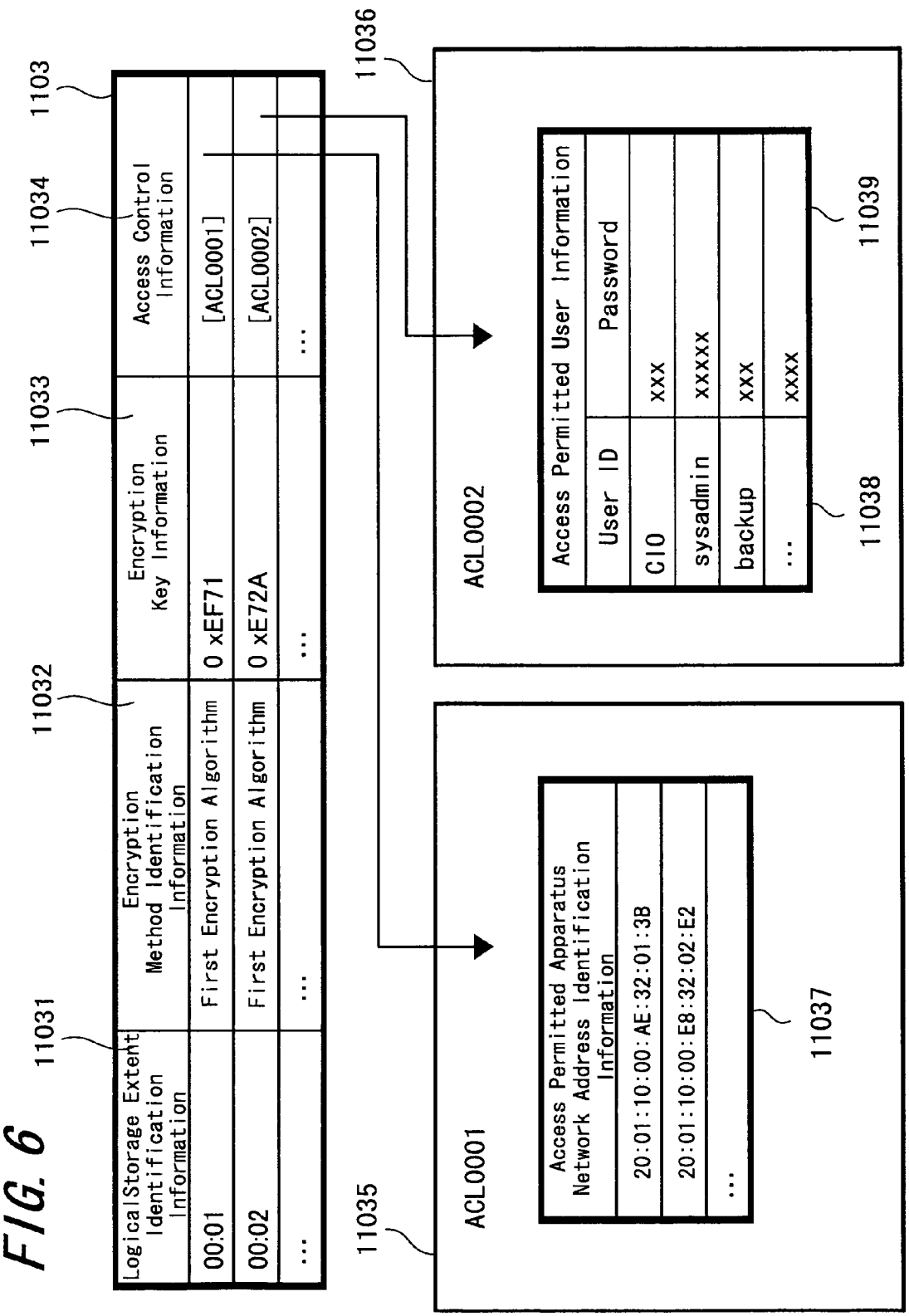
FIG. 6 is an implementation example of data encryption management information held in the storage system according to the present invention.

FIG. 6 is a diagram showing one example of the data encryption management information 1103 which is provided in the storage system 100. The data encryption management information 1103 is information recording an encryption status of all encrypted logical storage extents 120 among the logical storage extents 120 mounted on the storage system 100.

Logical storage extent identification information 11031 shows a value enabling to identify uniquely a logical storage extent 120. FIG. 6 shows an example in which the number assigned to each logical storage extent 120 is adopted as identification information and is recorded in the logical storage extent identification information 11031. An encryption method applied to data stored in the logical storage extent 120 is recorded in encryption method identification information 11032. In addition, a generally known encryption algorithm and a bit size of the encryption key thereof (number of bits) are recorded in the encryption method identification information 11032. An encryption and decryption key to the data stored in the logical storage extent 120 is recorded in encryption key information 11033. The encryption key information 11033 is a hash value to a password set beforehand for example, and is used as information for encrypting data or oppositely for decrypting data by computing the above-described hash value to original text data. Access control information 11034 is managed as a sub-table in which client information for permitting input/output to this logical storage extent 120 is written. The access control information sub-table may be expressed by a network address (11037) of the host computer 200 permitted to input/output to this logical storage extent 120 for example, or may be expressed by an ID (11038) and a password (11039) of a client user.

FIG. 7 shows one example of the storage extent configuration information 1107 which is provided in the storage system 100. Configuration information including a virtual configuration in addition to a physical configuration of the logical storage extent 120 mounted on the storage system 100 is recorded in the storage extent configuration information 1107.

Data I/O network interface identification information 11071 shows the data I/O network interface 140 of the storage system 100 to which the logical storage extent 120 described hereinafter is connected. This data I/O network interface identification information 11071 is expressed by the number uniquely determined within the apparatus of the data I/O network interface 140, a World Wide Name of Fiber Channel, and an MAC address of Ethernet (registered trademark), for example. Logical storage extent identification information 11072 shows the logical storage extent 120 which is connected to the data I/O network interface 140 shown in the above-described data I/O network interface identification information 11071. Information recorded in this logical storage extent identification information 11072 is expressed by an internal apparatus number assigned to each logical storage extent 120. A logical storage extent capacity 11073 is one which a memory capacity of the logical storage extent 120 shown in the above-described logical storage extent identification information 11072 is written with a unit such as GB (gigabyte) and MB (megabyte), for example.

Virtual storage extent judgment information 11074 is a boolean parameter to specify whether the logical storage extent 120 shown in the logical storage extent identification information 11072 is the one physically mounted within the same storage system 100, or whether the logical storage extent 120 is physically mounted on another storage system 100 and is treated as the one virtually mounted within the same storage system 100. If this logical storage extent 120 is one which is physically stored in another storage system 100 and is associated with the virtual storage extent, "1" showing YES is recorded in the virtual storage extent judgment information 11074. On the contrary, when the logical storage extent 120 is physically mounted within the same storage system 100 and is not the virtual storage extent, "0" showing NO is recorded in the virtual storage extent judgment information 11074. It should be noted that a method of managing a virtual storage extent is described in detail in Published Japanese Patent Application No. 2004-005370.

Information to identify uniquely the storage system 100 having the above-described virtual storage extent physically mounted is recorded in virtual storage extent apparatus identification information 11075. This virtual storage extent apparatus identification information 11075 is one which is expressed by an apparatus manufacturing number (serial number) that is a number to identify uniquely the storage system 100 and the World Wide Name of Fiber Channel. Alternatively, this information may be expressed by a Target ID of SCSI protocol. Identification information for identifying uniquely the virtual storage extent 120 of the above-described virtual storage extent within the storage system 100 which is identified by the above-described virtual storage extent apparatus identification information 11075 is recorded in virtual logical storage extent identification information 11076. Further, the virtual logical storage extent identification information 11076 is expressed by the internal apparatus number in the storage system 100 identified by the above-described virtual storage extent apparatus identification information 11075, for example. As an alternative, this information may be expressed by a LUN (Logical Unit Number) within the apparatus shown by the above-described Target ID.

FIG. 8 is one example of the program management information 1109 provided in the storage system 100. A list of programs having been installed within the storage system 100 is recorded in this program management information 1109.

Program identification information 11091 shows information which enables to identify uniquely the programs installed on the program memory 110 within the storage system 100. For example, a name of the installed data encryption program 1101 is expressed in the program identification information 11091 by a character string containing version information like "first encryption algorithm". Install date information 11092 shows a date when the program identified by the program identification information 11091 is installed on the storage system 100.

FIG. 9 shows one example of the asset management information 3102 provided in the management computer 300. The management computer 300 make an inquiry to the storage system 100 of a management object about the program installed into this storage system 100. The storage system 100 which has received the inquiry from the management computer 300 sends the above-described program management information 1109 to the management computer 300. The management computer 300 extracts a program corresponding to the above-described encryption program 1101 out of the received program management information 1109 and records in the asset management information 3102.

Apparatus identification information 31021 exhibits information which enables to identify uniquely the storage system 100 mounting an encryption method described hereinafter. This apparatus identification information 31021 is one which is expressed by the apparatus manufacturing number (serial number) that is the number to identify uniquely the storage system 100 and the World Wide Name of Fiber Channel, for example. In addition, encryption method identification information 31022 exhibits the identification information of the encryption program 1101 which is mounted on the storage system 100 identified by the above-described apparatus identification information 31021. Further, install date information 31023 is one which shows a date when the encryption program 1101 identified by the encryption method identification information 31022 described hereinbefore is installed on the storage system 100 identified by the above-described apparatus identification information 31021.

FIG. 10 shows one example of the data encryption management information 3105 provided in the management computer 300. The management computer 300 commands the storage system 100 of the management object to send the above-described data encryption management information 1103 held in the storage system 100. The storage system 100 which has received the command from the management computer 300 sends the above-described data encryption management information 1103 to the management computer 300. The management computer 300 writes additionally apparatus identification information 31055 into the received data encryption management information 1103, and records in the data encryption management information 3105 shown in FIG. 10.

In FIG. 10, the apparatus identification information 31055 exhibits the storage system 100 mounting the logical storage extent 120 which is identified by logical storage extent identification information 31051 described hereinafter. Also, the logical storage extent identification information 31051 shows information for identifying uniquely the logical storage extent 120 similarly to the above-described logical storage extent identification information 11031, and encryption method identification information 31052 shows the encryption program 1101 applied to the data which is stored in the logical storage extent 120 identified by the above-described logical storage extent identification information 31051 similarly to the encryption method identification information 11032 described hereinbefore. Similarly to the above-described encryption key information 11033, encryption key information 31053 is key information used for encryption and decryption of the logical storage extent 120 identified by the logical storage extent identification information 31051 described hereinbefore. Similarly to the above-described access control information 11034, access control information 31054 is information on access authority to the logical storage extent 120 identified by the above-described logical storage extent identification information 31051, and is one which is expressed by a list of sub-table.

FIG. 11 shows one example of the storage extent configuration information 3107 provided in the management computer 300. The management computer 300 commands the storage system 100 of the management object to send the above-described storage extent configuration information 1107 held in the storage system 100. The storage system 100 receives the command and sends the above-described storage extent configuration information 1107 to the management computer 300. The management computer 300 writes additionally apparatus identification information 31077 into the storage extent configuration information 1107 received from the storage system 100, and records in this storage extent configuration information 3107.

The storage system 100 mounting the logical storage extent 120 identified by logical storage extent identification information 31072 described later is recorded in the apparatus identification information 31077. Similarly to the above-described data I/O network interface identification information 11071, Data I/O network interface identification information 31071 shows information for identifying uniquely the data I/O network interface 140 to which the logical storage extent identification information 31072 described later is connected. Further, similarly to the above-described logical storage extent identification information 11072, the logical storage extent identification information 31072 shows information for identifying uniquely the logical storage extent 120 within the storage system identified by the above-described apparatus identification information 11077, and similarly to the above-described logical storage extent capacity 11073, a logical storage extent capacity 31073 shows a memory capacity of the logical storage extent 120 identified by the above-described logical storage extent identification information 31072. Similarly to the above-described virtual storage extent judgment information 11074, virtual storage extent judgment information 31074 exhibits a truth-value for judging whether this logical storage extent 120 is a virtual storage extent, and similarly to the above-described virtual storage extent apparatus identification information 11075, virtual storage extent apparatus identification information 31075 shows information for identifying uniquely the storage system 100 mounting physically this logical storage extent 120. Similarly to the above-described virtual logical storage extent identification information 11076, virtual logical storage extent identification information 31076 is information for identifying uniquely a physical logical storage extent 120 of a virtual storage extent.

FIG. 12 shows one example of the encryption method compatibility information 3111 provided in the management computer 300. This encryption method compatibility information 3111 is one which expresses the compatibility between one encryption method and another encryption method by a boolean value. In FIG. 12, the compatibility between a data encryption program 1101 shown in the vertical axis and a data encryption method 1101 shown in the horizontal axis is written with the boolean value in a cell where both axes intersect. In the present embodiment, "1" meaning YES is recorded when the data encryption program 1101 of the horizontal axis is upwardly compatible with the data encryption program 1101 of the vertical axis, and "0" meaning NO is recorded when there exists no compatibility. For example, it is exhibited that there is the upward compatibility in "second encryption algorithm" and "third encryption algorithm" with respect to "first encryption algorithm" of FIG. 12, more specifically that data encrypted by "first encryption algorithm" can be decrypted by "second encryption algorithm" and "third encryption algorithm". On the other hand, there exists no data encryption program 1101 having the upward compatibility with "second encryption algorithm", and data encrypted by "second encryption algorithm" can not be decrypted by another data encryption program 1101.

FIG. 12 is explained more specifically. For example, data encrypted by "DES" encryption method of key length of 64 bits can be decrypted by another data encryption method 1101 of "DES" encryption method which is capable of calculating by a key length of 128 bits. In further another example, data encrypted by the "DES" encryption method can be decrypted by a data encryption program 1101 of "TRIPLEDES" encryption method which repeats trebly this "DES" method.

One of assumed cases in the present invention is that a storage system 100 having stored encrypted data becomes obsolete after a long time has passed and the data is migrated into a storage system 100 of a new model. Under such situation, it is necessary to migrate the data in such a manner that the data encrypted by the data encryption program 1101 of the old model storage system 100 can also be decrypted by the new model storage system 100. Then, by managing this encryption method compatibility information 3111, the new model storage system 100 is made to be able to judge whether a data encryption program 1101 compatible with the data encryption program 1101 of the old model storage system 100 is mounted or not.

Figure 13:
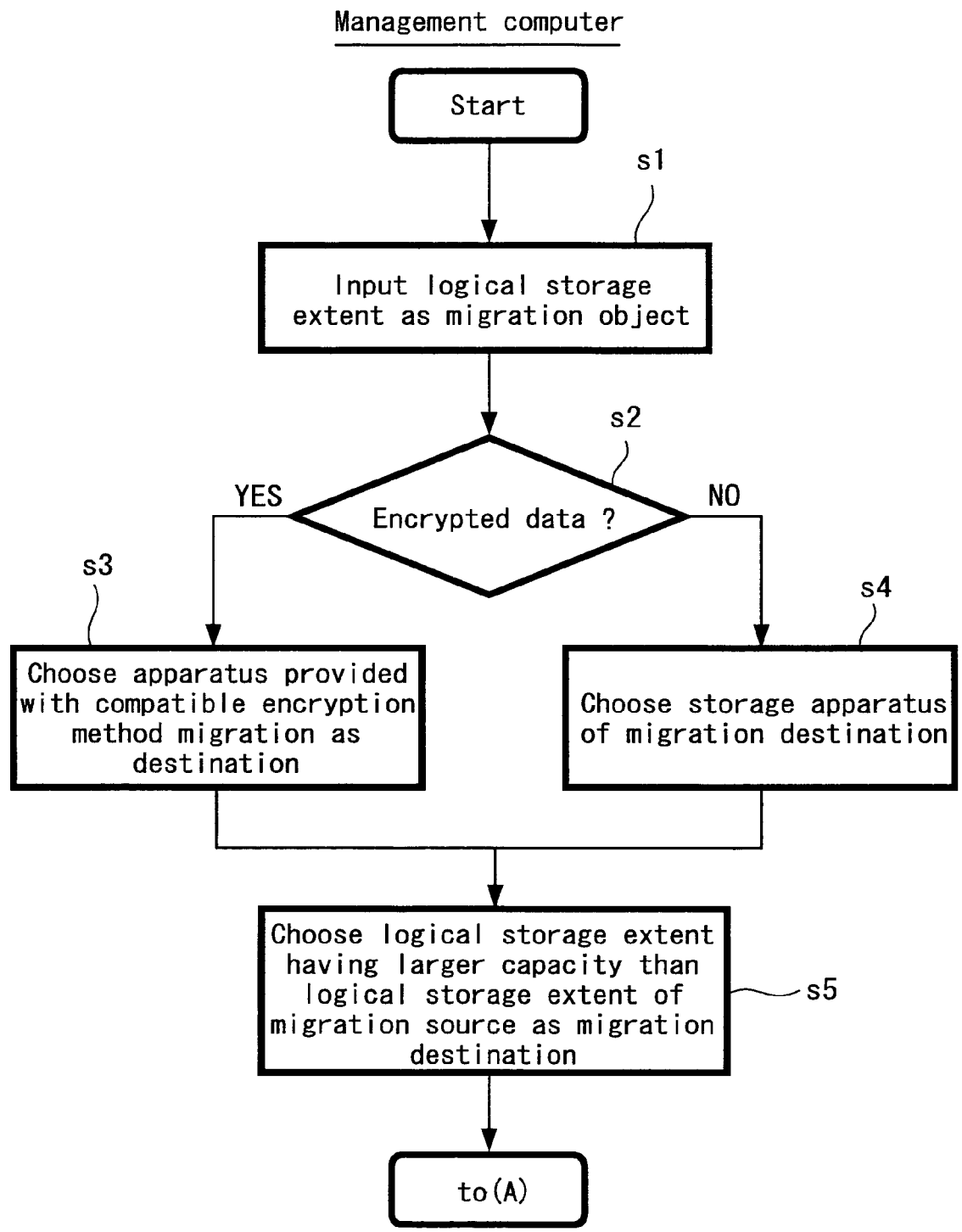
FIG. 13 is a flow chart showing processing of migrating encrypted data to another storage apparatus according to the present invention.
Figure 14:
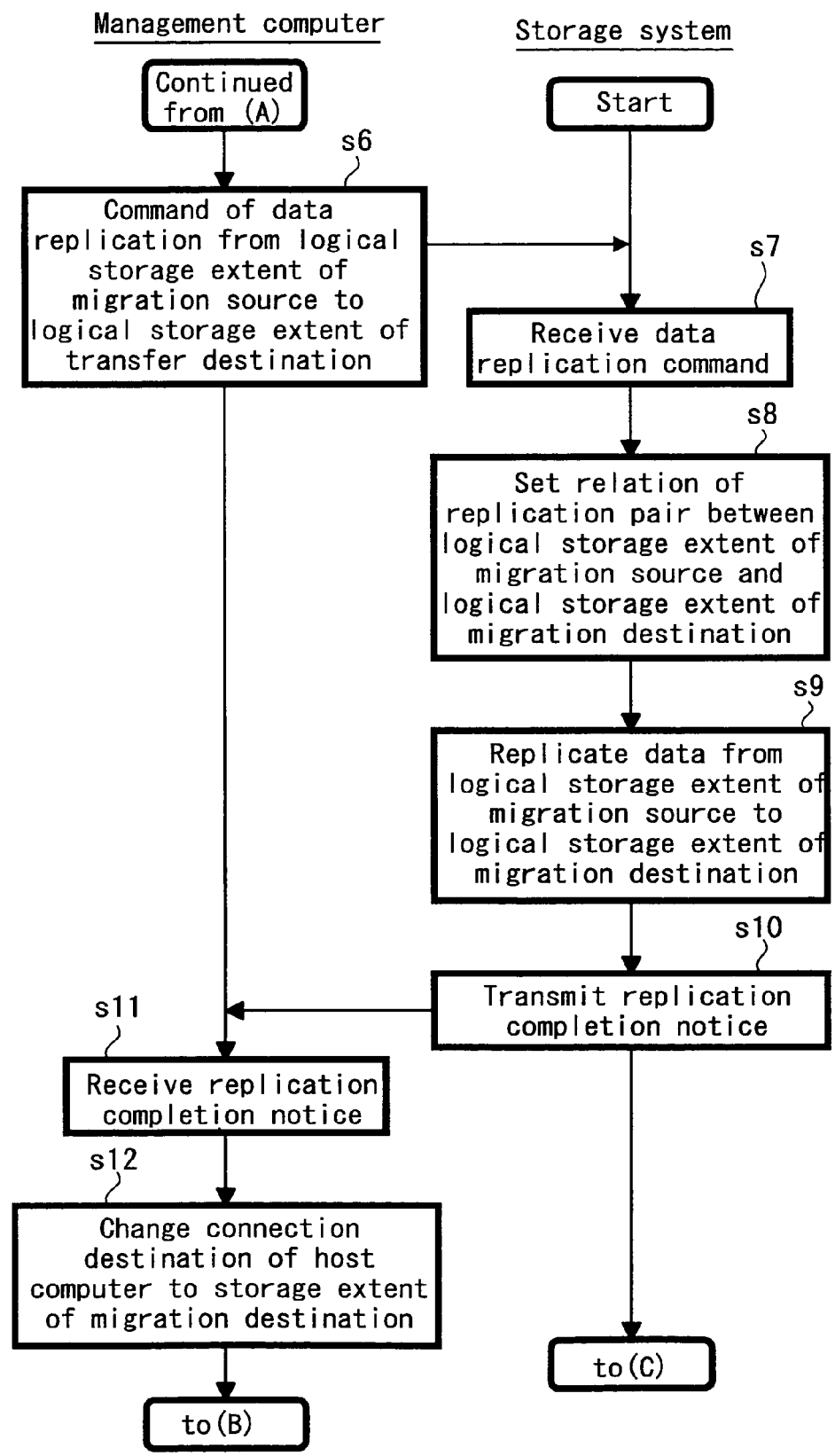
FIG. 14 is a flow chart showing processing of migrating encrypted data to another storage apparatus according to the present invention.
Figure 15:
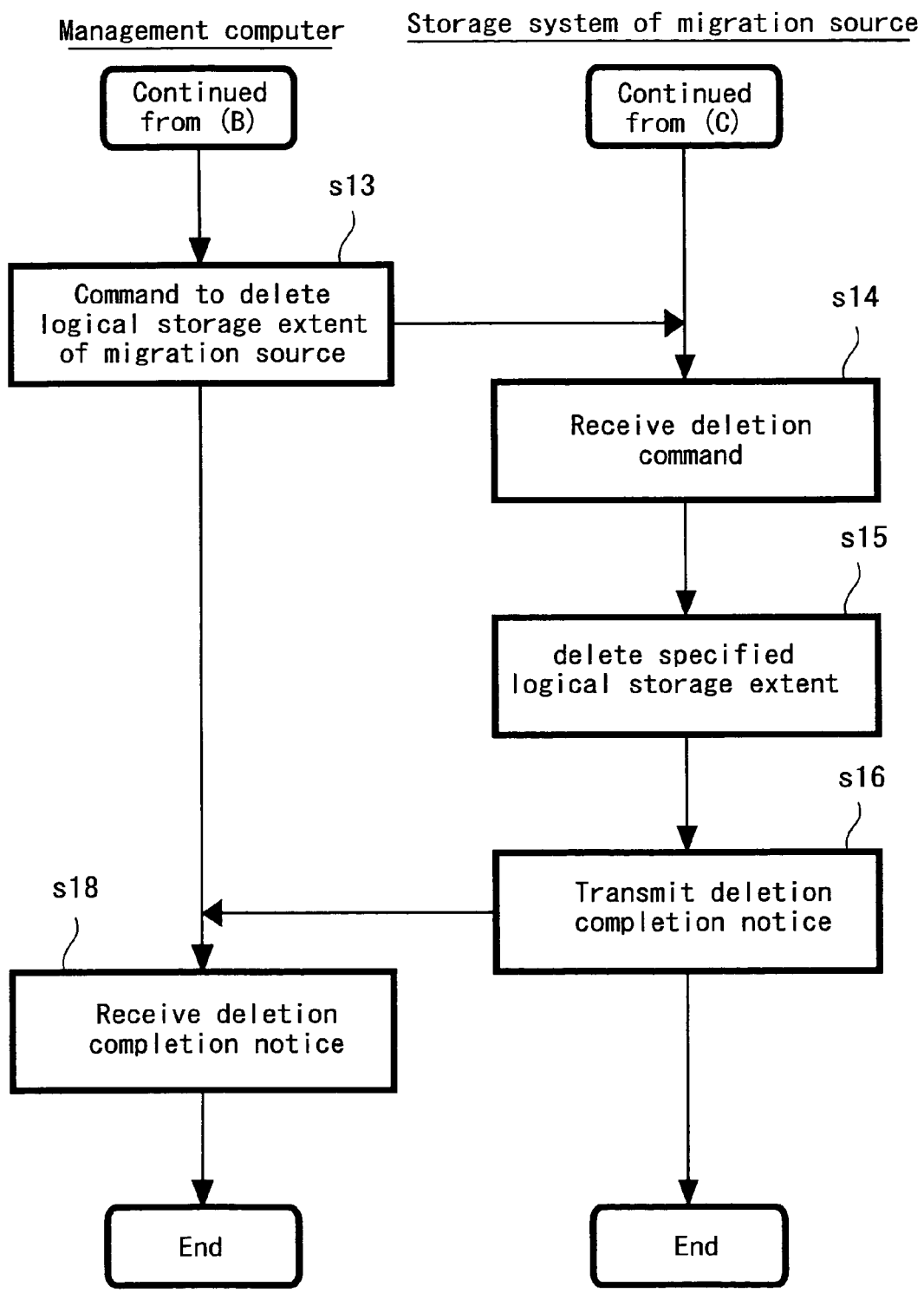
FIG. 15 is a flow chart showing processing of migrating encrypted data to another storage apparatus according to the present invention.

FIG. 13, FIG. 14 and FIG. 15 are flow charts showing a procedure of a migration method of encrypted data between apparatuses in the present embodiment.

First, when migrating data between storage systems 100 in FIG. 13, an operator of a management computer 300 specifies a logical storage extent 120 which is a migration object and inputs this logical storage extent from the input interface 370 (step s1). Next, the data encryption update management program 3104 of the management computer 300 retrieves the data encryption management information 3105 and judges whether the logical storage extent 120 of the migration object inputted at step s1 is encrypted (step s2). When a result of judgment at step s2 is YES, the data encryption update management program 3104 retrieves the encryption method compatibility information 3111 and searches for an encryption method having upward compatibility with the logical storage extent 120 of the migration object. Moreover, the asset management information 3102 is retrieved and a storage system 100 having a compatible encryption method mounted is searched. The storage system 100 mounting this compatible encryption method is chosen as a storage system 100 of a destination of data migration (step s3).

On the other hand, when the result of judgment at step s2 is NO, more specifically when the logical storage extent 120 of the migration object is not encrypted, a storage system 100 of a migration destination is chosen in an ordinary manner (step s4). Next, the data encryption update management program 3104 chooses one which is made into a logical storage extent 120 of the destination of data migration out of logical storage extents 120 mounted on the storage system 100 of the migration destination chosen in step s3 or in step s4. At this time, a logical storage extent 120 having the same or larger capacity than the logical storage extent 120 of a migration source is chosen as the logical storage extent 120 of the migration destination (step s5). It should be noted that each storage apparatus may be specified at the time of choosing the logical storage extent 120 as the migration object in step s1. In addition, a warning may be generated if a storage apparatus satisfying with the condition can not be found at the time of choosing the storage system 100 having the compatible encryption method mounted as the storage system 100 of the destination of data migration in step s3. Furthermore, though only a encrypted data migration operation of the management computer 300 is shown in FIG. 13, the operation is not limited to this, but the storage system 100 or the host computer 200 may perform similar encrypted data migration operation to the management computer 300 by providing the storage system 100 or the host computer 200 with a configuration similar to the above-described management computer 300.

After going through the processing described hereinabove, the process moves to (A) shown in a flow chart of FIG. 14. First, the data replication program 3103 commands the storage system 100 of the migration source to replicate the logical storage extent 120 chosen in step s1 into the logical storage extent 120 chosen in step s5 which is mounted on the storage system 100 of the migration destination chosen in step s3 or step s4 (step s6). The logical storage extent 120 of the migration source, the storage system 100 of the migration destination and the logical storage extent 120 of the migration destination are written in a data replication command message transmitted at this time. Communications of all management information are performed through the management information I/O program 3110. The management information I/O program 1110 mounted on the storage system 100 receives the data replication command message transmitted in step s6 (step s7). Next, if there is a necessity, the data replication program 1105 sets the storage systems 100 of the migration source and the migration destination to establish a relation of replication pair between the logical storage extent 120 of the migration source and the logical storage extent 120 of the migration destination (step s8). Furthermore, the data replication program 1105 performs data replication from the logical storage extent 120 of the migration source to the logical storage extent 120 of the migration destination (step s9). After data replication, since new encrypted data is being produced in the storage system 100 of the migration destination in case that this data is encrypted data, this is updated into the data encryption management information 1103. After this is completed, the storage system 100 transmits a replication completion notice to the management computer 300 through the management information I/O program 1110 (step s10). When the replication completion notice is transmitted in step s10, the management computer 300 receiving this notice receives this replication completion notice through the management information I/O program 3110 (step s11), and successively the data encryption management information 3105 is updated. Next, the management computer 300 requests the host computer 200 to change a logical storage extent 120 of a connection destination to the logical storage extent 120 of the replication destination which is replicated in step s9 (step s12).

As a result thereof, there is no host computer 200 which makes access to the logical storage extent 120 before migration, and this logical storage extent 120 becomes unnecessary. Next, the process moves to (B) and (C) of the flow chart shown in FIG. 15. First, the management computer 300 commands the storage system 100 of the migration source to delete the logical storage extent 120 of the migration source (step s13). Identification information on the logical storage extent as a deletion object is written in this deletion command message, and this deletion command message is sent to the storage system 100 through the management information I/O program 3110. The storage system 100 receives the deletion command message sent through the management information I/O program 3110 (step s14). Further, the storage system 100 releases and deletes the logical storage extent 120 (step s15). Since the cryptic data disappears from the storage system 100 of the migration source as a result of deletion, the logical storage extent 120 is deleted from the data encryption management information 1103 and at the same time, is also deleted from the storage extent configuration information 1107. Thereafter, the management information I/O program 1110 transmits a deletion completion notification message to the management computer 300 (step s16). Subsequently, the management computer 300 receives the deletion completion notice through the management information I/O program 3110 (step s18), and updates the data encryption management information 3105. Furthermore, the storage extent configuration information 3107 is also updated.

The storage system 100 having the compatible data encryption program 1101 mounted has been chosen as the migration destination of the encrypted data and the processing of migrating the data to this apparatus has been achieved by the processing described hereinbefore.

Figure 16:
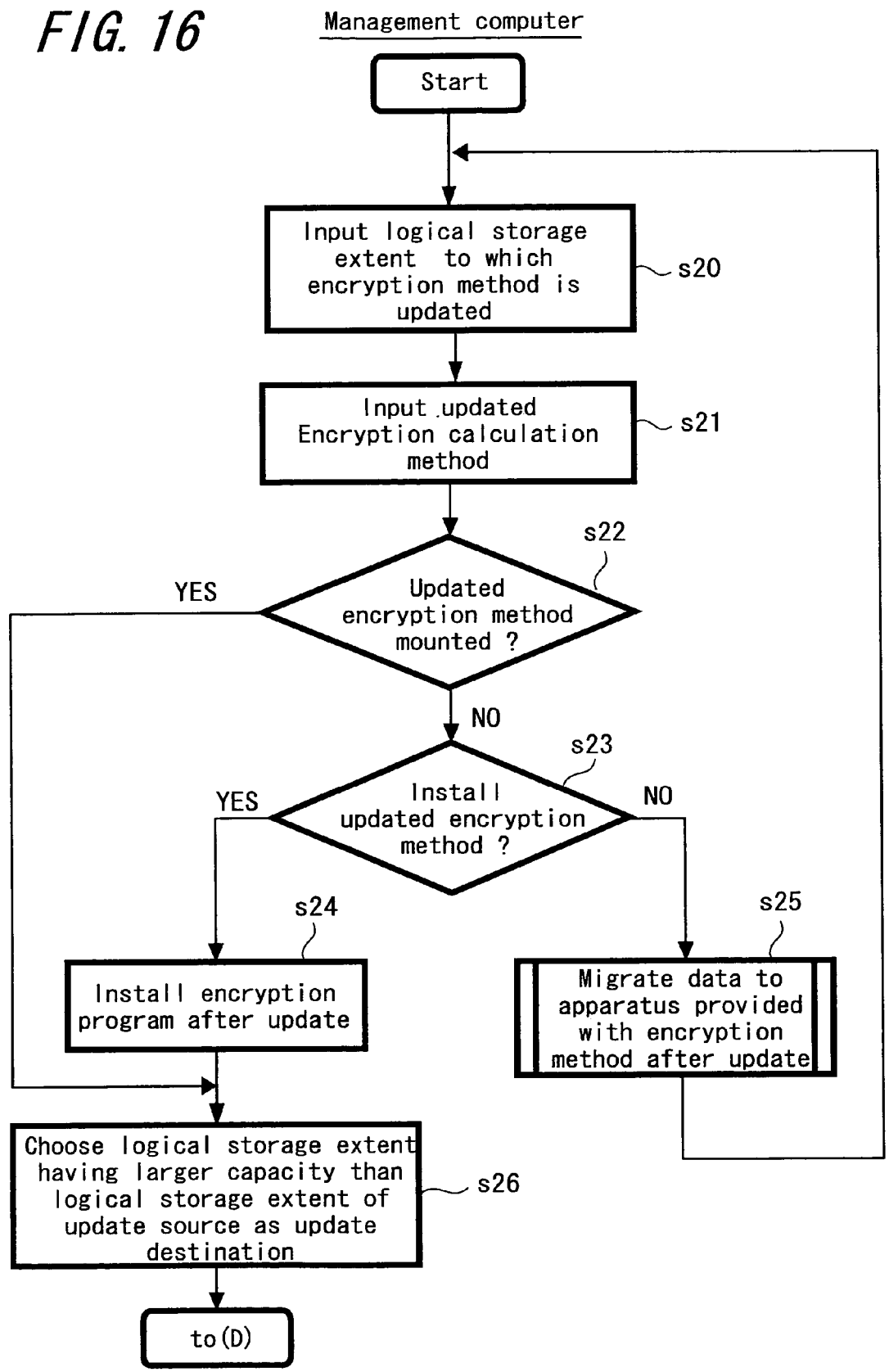
FIG. 16 is a flow chart showing processing of updating encrypted data into encrypted data encrypted by another encryption method according to the present invention.
Figure 17:
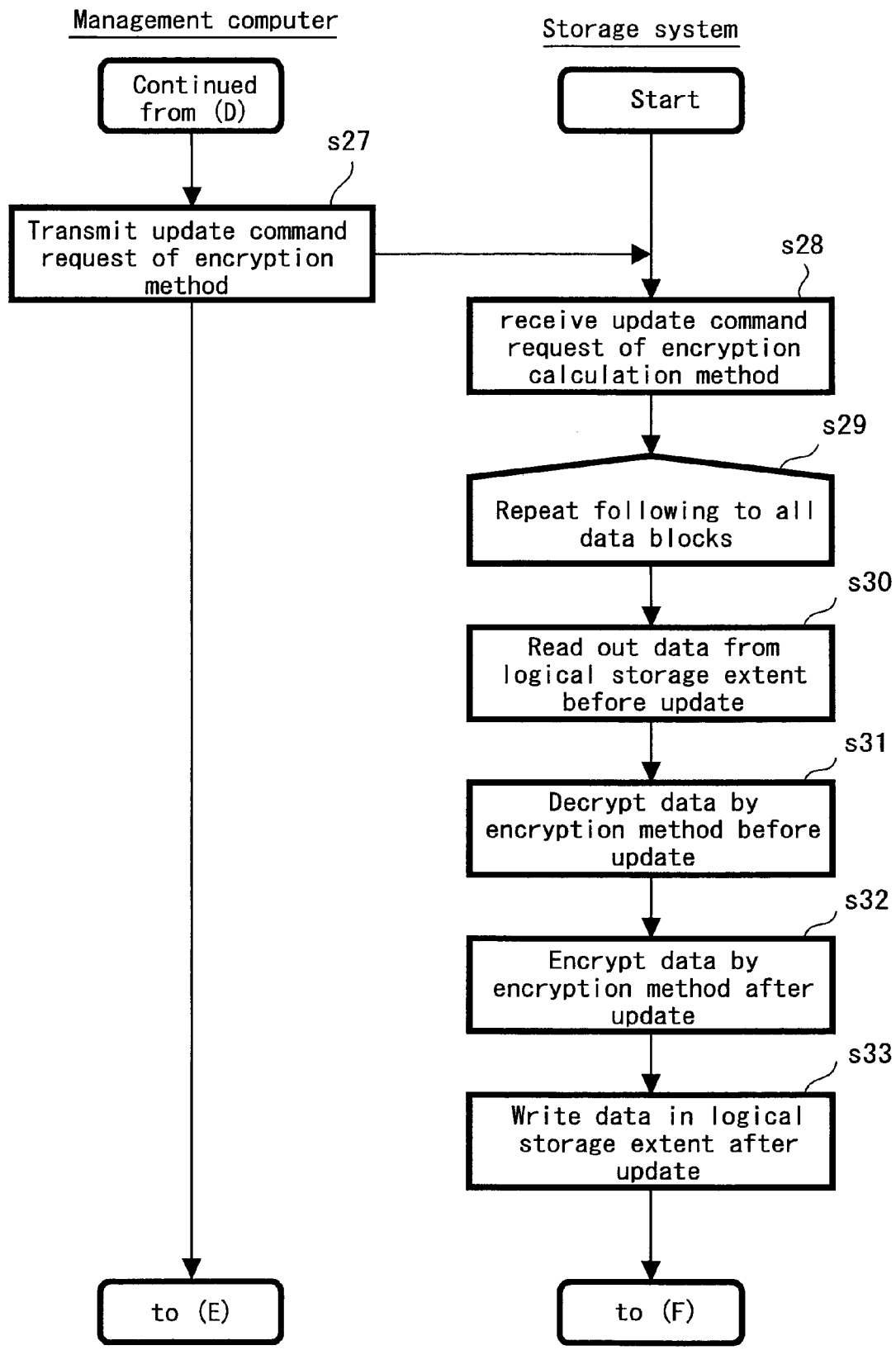
FIG. 17 is a flow chart showing processing of updating encrypted data into encrypted data encrypted by another encryption method according to the present invention.
Figure 18:
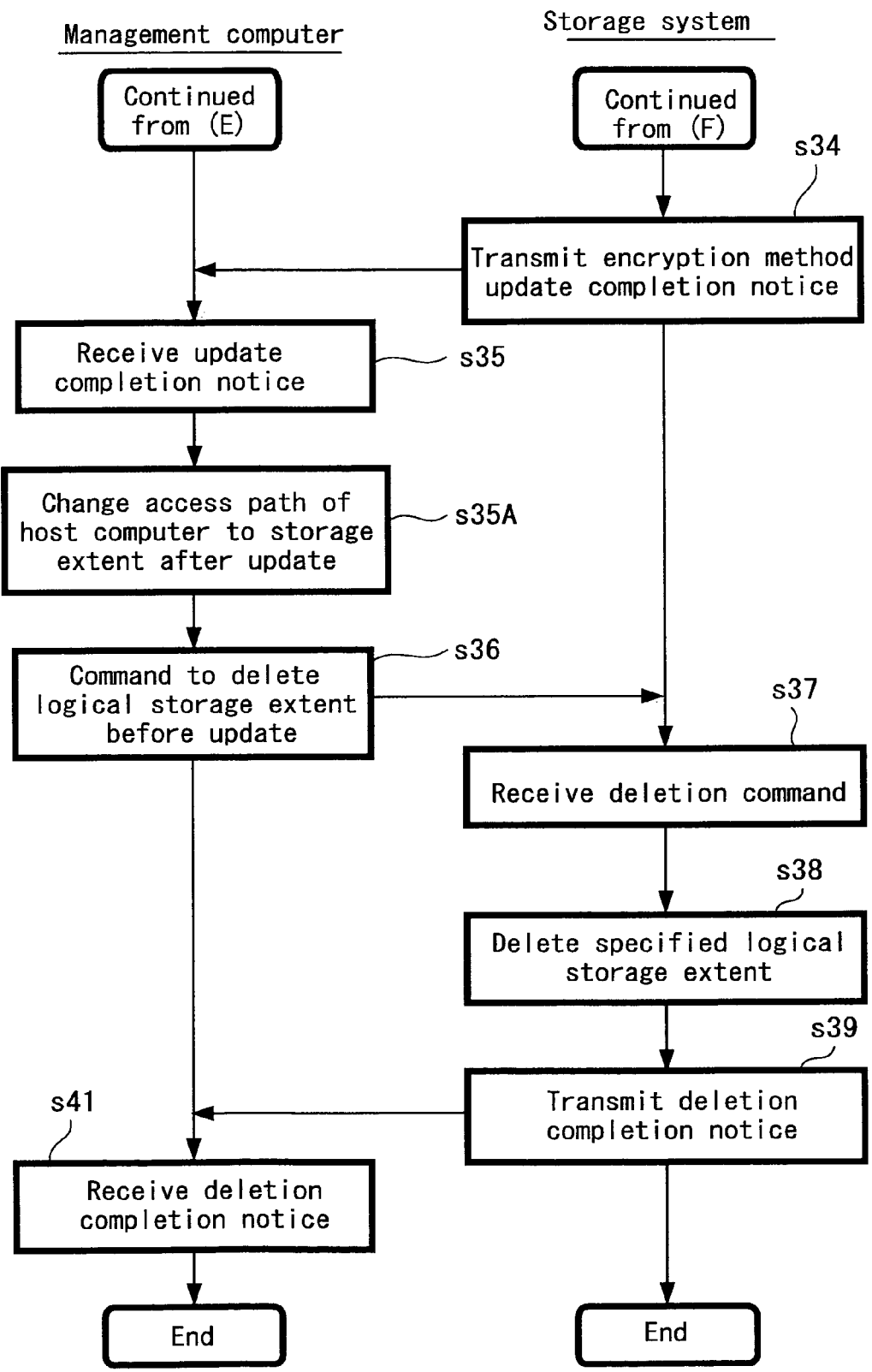
FIG. 18 is a flow chart showing processing of updating encrypted data into encrypted data encrypted by another encryption method according to the present invention.

FIG. 16, FIG. 17 and FIG. 18 are flow charts showing a procedure of processing of updating securely and at high speed the encryption method of the encrypted data stored on the storage system 100.

First, in FIG. 16, an operator of the management computer 300 chooses a logical storage extent 120 as an object to update the encryption method into another encryption method, and inputs this logical storage extent from an input interface 170 (step s20). Furthermore, the operator inputs a newly applied encryption method from the input interface 170 (step s21). The data encryption update management program 3104 provided in the management computer 300 refers to the asset management information 3102, and judges whether the encryption method inputted in step s21 is mounted on the storage system 100 mounting the logical storage extent 120 inputted in step s20 (step s22). When a result of judgment thereof is YES, the process is continued to processing of step s26 described later. On the contrary, when the result is NO, the data encryption update management program 3104 urges the operator to input further, and inquires whether a new updated encryption method is installed on the storage system 100 mounting the logical storage extent 120 inputted in step s20 (step s23). When a result of input by the operator is YES in judgment step s23, more specifically when it is judged to install the inputted encryption method, the operator installs a new data encryption program 1101 on the storage system 100 (step s24). It should be noted that the program install management program 1108 provided in the storage system 100 may be used to install this data encryption program 1101. The program install management program 1108 is a program to support the install of a new program and the deletion of an existing program.

On the other hand, when the result of judgment in step s23 is NO, more specifically when it is judged not to install the updated encryption method, this processing is performed again from the beginning after the logical storage extent 120 inputted in step s20 is once transferred to the storage system 100 mounting the encryption method inputted in step s21 (step s25) in order to continue this processing. It should be noted that the above-described method shown in FIG. 12 only has to be applied to the processing of migrating data between apparatuses in step s25. Next, when the data encryption program 1101 corresponding to the updated encryption method is mounted on the storage system through processing in step s22 or step s24, the data encryption update management program 3104 chooses a logical storage extent 120 having the same or larger capacity than the logical storage extent 120 chosen in step s20, which is made into a logical storage extent 120 for storing encrypted data after update (step s26).

Next, the process moves to (D) in the flow chart shown in FIG. 17. First, the data encryption update management program 3104 provided in the management computer 300 commands the storage system 100 to update the encryption method (step s27). A logical storage extent 120 to be updated, an encryption method to be updated and newly applied, and a logical storage extent 120 to store encrypted data after update are written in this update command message of encryption method. It should be noted that communications of all management information are performed through the management information I/O program 3110. The storage system 100 receives the update command message of encryption method through the management information I/O program 1110 (step s28). The data encryption update program 1104 repeats following processing from step s29 to step s33 to all data blocks stored on the logical storage extent 120 of the update object.

First, the data encryption update program 1104 reads out data from the logical storage extent 120 of the update object by a unit of data block (step s30). This read-out data is stored temporarily on the data I/O cache memory 130. Since this data is encrypted, the data encryption update program 1104 requests the data encryption program 1101 to once decrypt this data within the cache memory 130 (step s31). Next, the data encryption update program 1104 requests the data encryption program 1101 corresponding to the encryption method applied after update so as to encrypt the data by this encryption method (step s32). Furthermore, the data encryption update program 1104 writes the encrypted data in the logical storage extent 120 after update (step s33). The update of the encryption method is completed when the processing from step 29 to step 33 is repeated to all data blocks.

Then, the process proceeds to the flow chart in FIG. 18. In FIG. 18, the storage system 100 transmits a completion notification message of the update of the encryption method to the management computer 300 through the management information I/O program 1110 (step s34). The management information I/O program 3110 of the management computer 300 receives this completion notice (step s35). The data encryption update management program 3104 provided in the management computer 300 changes the host computer 200 such that the logical storage extent 120 of a connection destination is updated from the logical storage extent 120 before update of the encryption method inputted in step s20 into the logical storage extent 120 after update which is chosen in step s26 (step s35A).

By the processing described hereinbefore, the logical storage extent 120 before update of the encryption method is not accessed from any of the host computers 200, and practically becomes unnecessary. Next, the management computer 300 commands the storage system 100 to delete the logical storage extent 120 before update (step s36). Then, the management information I/O program 1110 of the storage system 100 receives the deletion command message (step s37). Next, the storage system 100 releases and deletes the requested logical storage extent 120 (step s38). Furthermore, the storage extent configuration information 1107 and the data encryption management program 1102 are updated at this point of time. The storage system 100 transmits a completion notification message of the deletion of the logical storage extent 120 through the management information I/O program 1110 (step s39). The management computer 300 receives the above-described deletion completion notification message through the management information I/O program 3110 (step s41). The storage extent configuration information 3107 and the data encryption management information 3105 are updated at this point of time.

The logical storage extent 120 having stored the encrypted data is updated to another encryption method and is stored on another logical storage extent 120 by the above-described series of processing shown in FIG. 16, FIG. 17 and FIG. 18.

Figure 19:
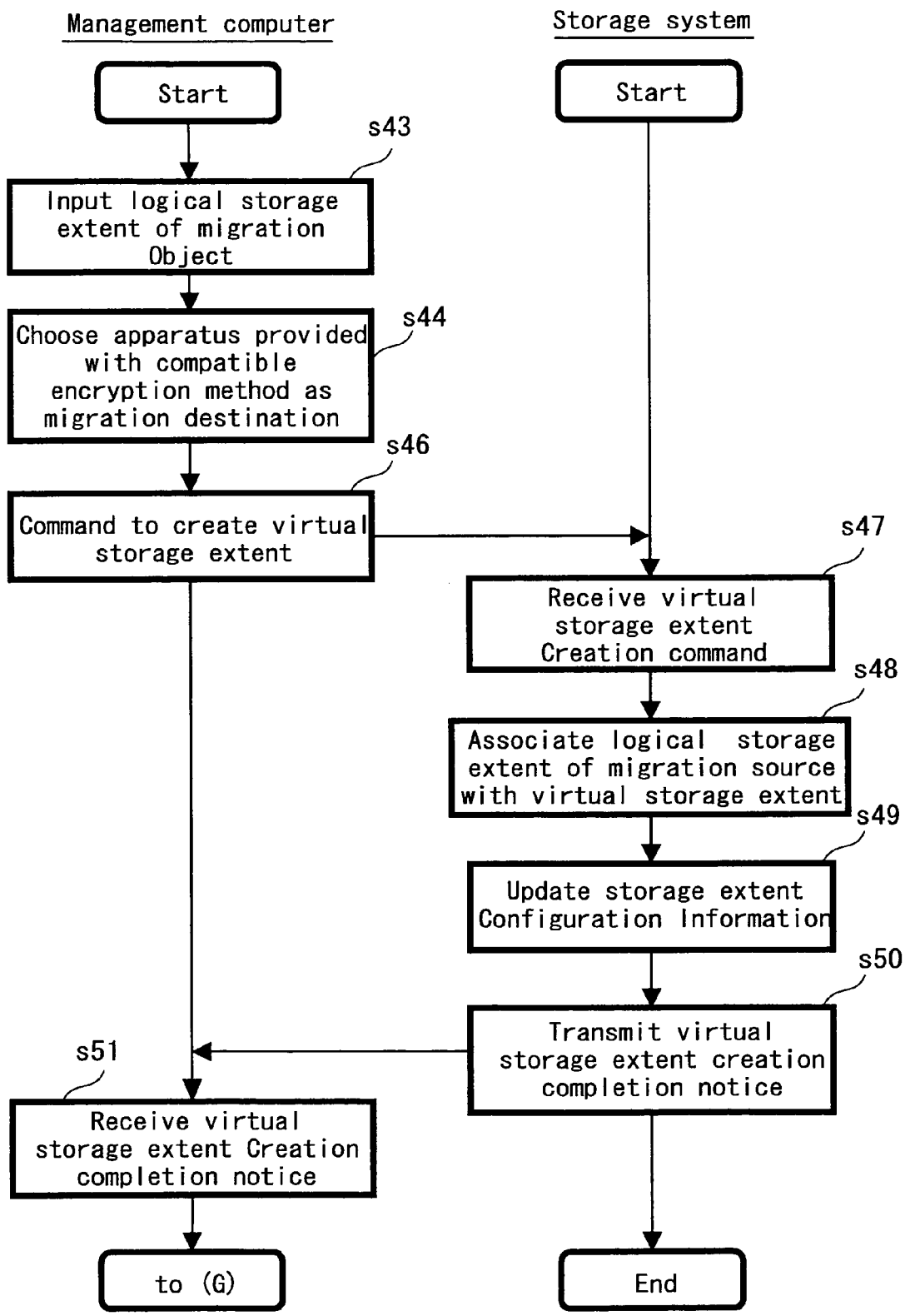
FIG. 19 is a flow chart showing transfer processing of encrypted data using a technology of virtual storage extent management according to the present invention.
Figure 20:
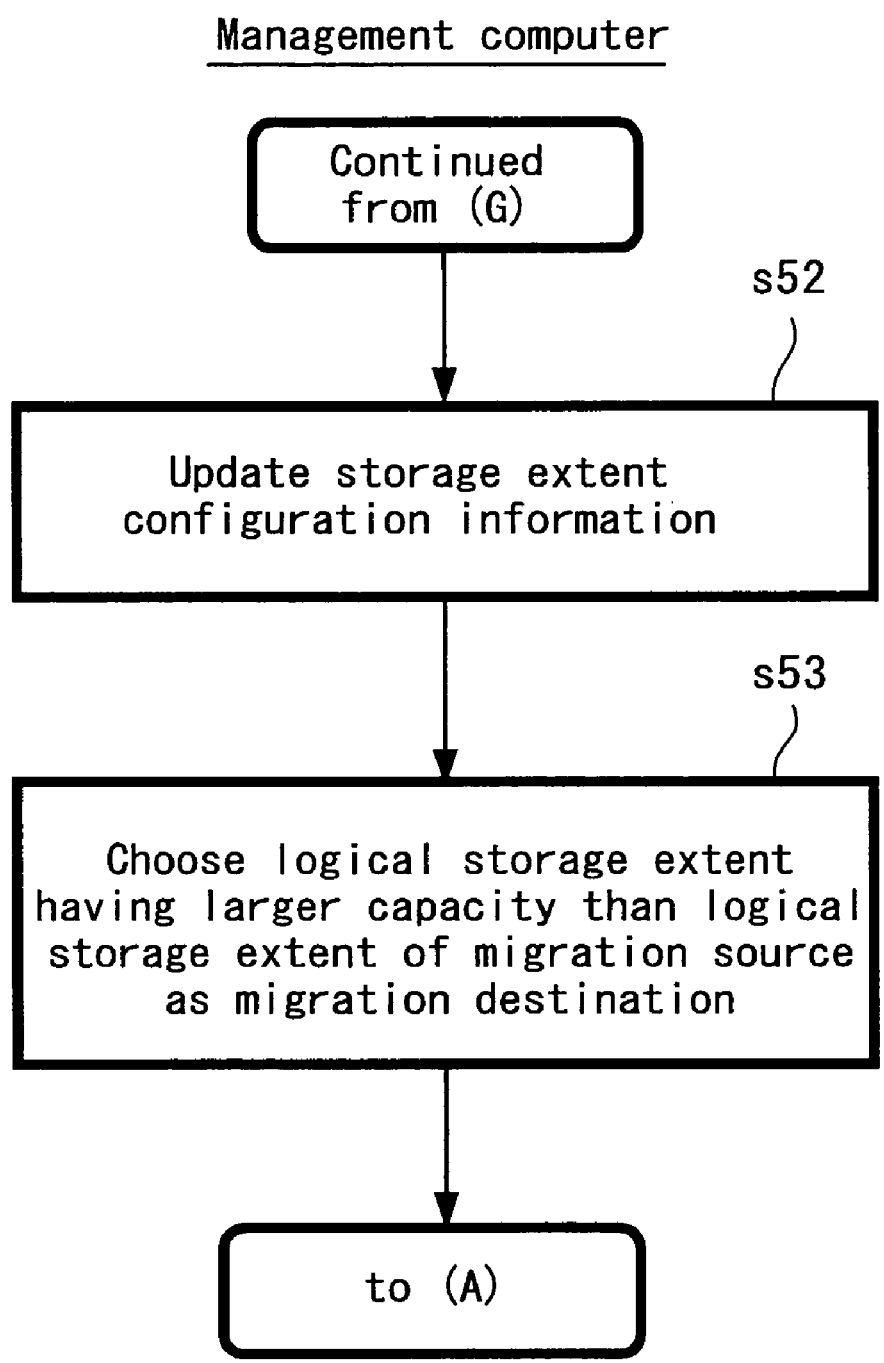
FIG. 20 is a flow chart showing migration processing of encrypted data using a technology of virtual storage extent management according to the present invention.

FIG. 19 and FIG. 20 are flow charts of migration processing of encrypted data using a technology of virtual storage extent management. When the migration processing of a virtual storage extent between storage systems 100 is performed in this flow chart, the virtual storage extent management program 1106 provided in the storage system 100 makes the host computer 200 recognize only the virtual storage extent of the storage system 100. Further, the virtual storage extent management program 1106 controls an input/output command from the host computer 200 to this virtual storage extent, and actually performs input/output to a logical storage extent associated with this virtual storage extent. A mechanism of this virtual storage extent management is used to realize the migration of encrypted data. It should be noted that this method of migrating the encrypted data can be a substitute of the method of migrating the encrypted data in FIG. 13.

First, similarly to step s1, an operator of the management computer 300 inputs a logical storage extent 120 of a migration object from the input interface 370 in FIG. 19 (step s43). Next, similarly to step s3, a storage system 100 provided with a compatible encryption method is chosen as a migration destination (step s44). Successively, the data encryption update management program 3104 commands the storage system 100 chosen in step s44 as the migration destination to create a virtual storage extent (step s46). More specifically, the command requests such that the virtual storage extent is created within the storage system 100 of the migration destination and the logical storage extent 120 on the apparatus of the migration source inputted in step s43 is associated with this created logical storage extent to make a storage extent configuration as if the logical storage extent 120 of the migration source were mounted within the storage system 100 of the migration destination. The storage system 100 of the migration destination receives the virtual storage extent creation command message through the management information I/O program 1110 (step s47). The virtual storage extent management program 1106 associates the logical storage extent 120 stored on the apparatus of the migration source with the virtual storage extent within the storage system 100 in accordance with the above-described virtual storage extent creation command (step s48). Further, the virtual storage extent management program 1106 reflects a result thereof to the storage extent configuration information 1107 (step s49). Successively, the management information I/O program 1110 transmits a completion notification message of the creation of the virtual storage extent to the management computer 300 (step s50). Then, the management information I/O program 3110 provided in the management computer 300 receives this completion notice (step s51).

Furthermore, the management computer 300 reflects a result thereof to the storage extent configuration information 3107 in FIG. 20 (step s52). Next, the data encryption update management program 3104 chooses a logical storage extent 120, which has the same or larger capacity than the logical storage extent 120 of the migration source inputted in step s43 and which is stored on the storage system 100 of the migration destination, as a logical storage extent 120 to store encrypted data after update of the encryption method (step s53). At this time, a destination to save the data after update can also be set to another storage system 100 by making the chosen logical storage extent 120 further into a virtual storage extent.

The logical storage extents 120 of the migration source and the migration destination are chosen by the processing described hereinbefore. At this time, since the logical storage extent 120 of the migration source can be treated as the virtual storage extent within the storage system 100 of the migration destination, data replication processing can be performed as processing within this storage system 100. Since data migration processing performed thereafter is similar to the procedure shown in FIG. 14 and FIG. 15, an explanation herein is omitted.

Figure 21:
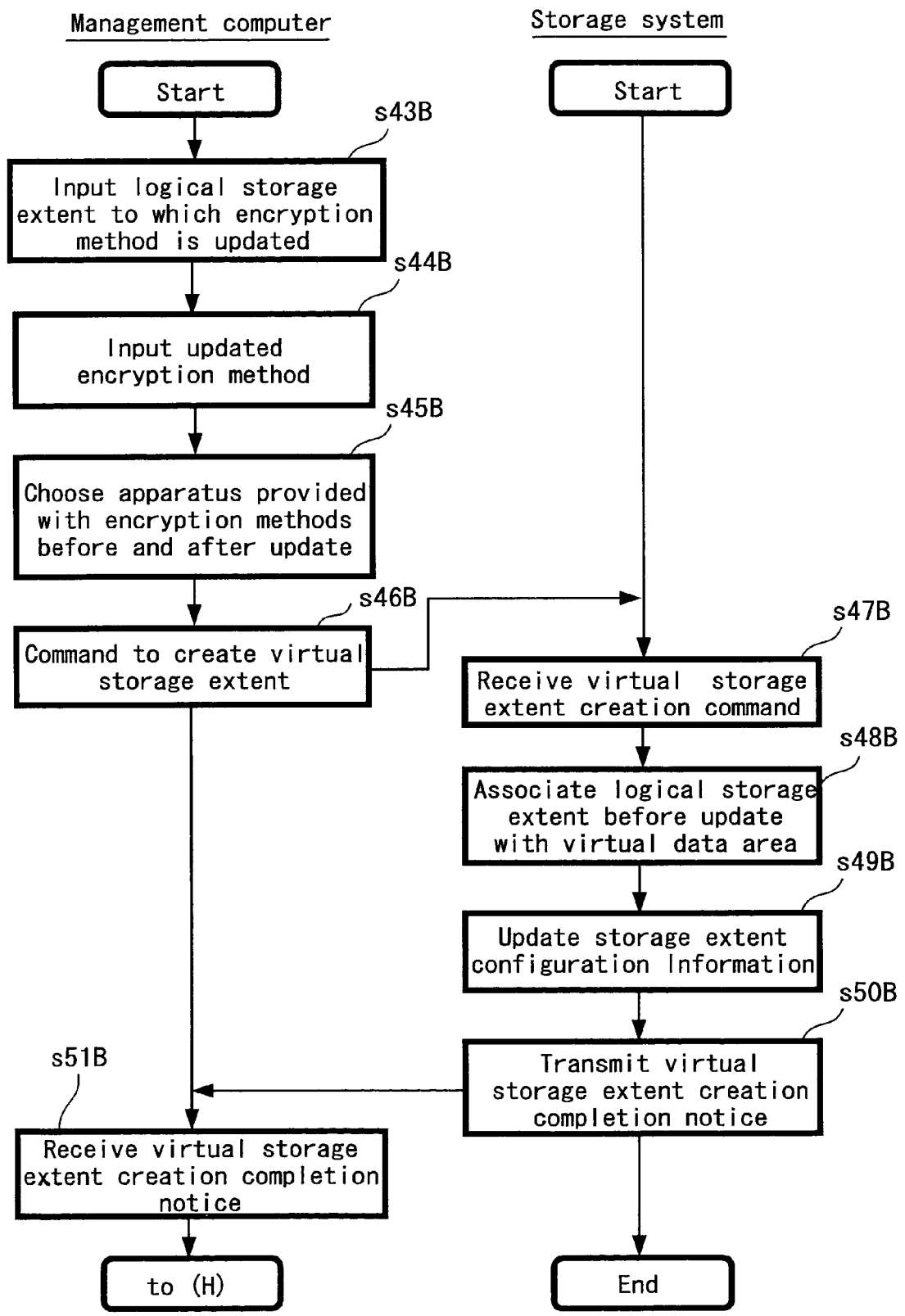
FIG. 21 is a flow chart showing update processing of encryption method using a technology of virtual storage extent management according to the present invention.
Figure 22:
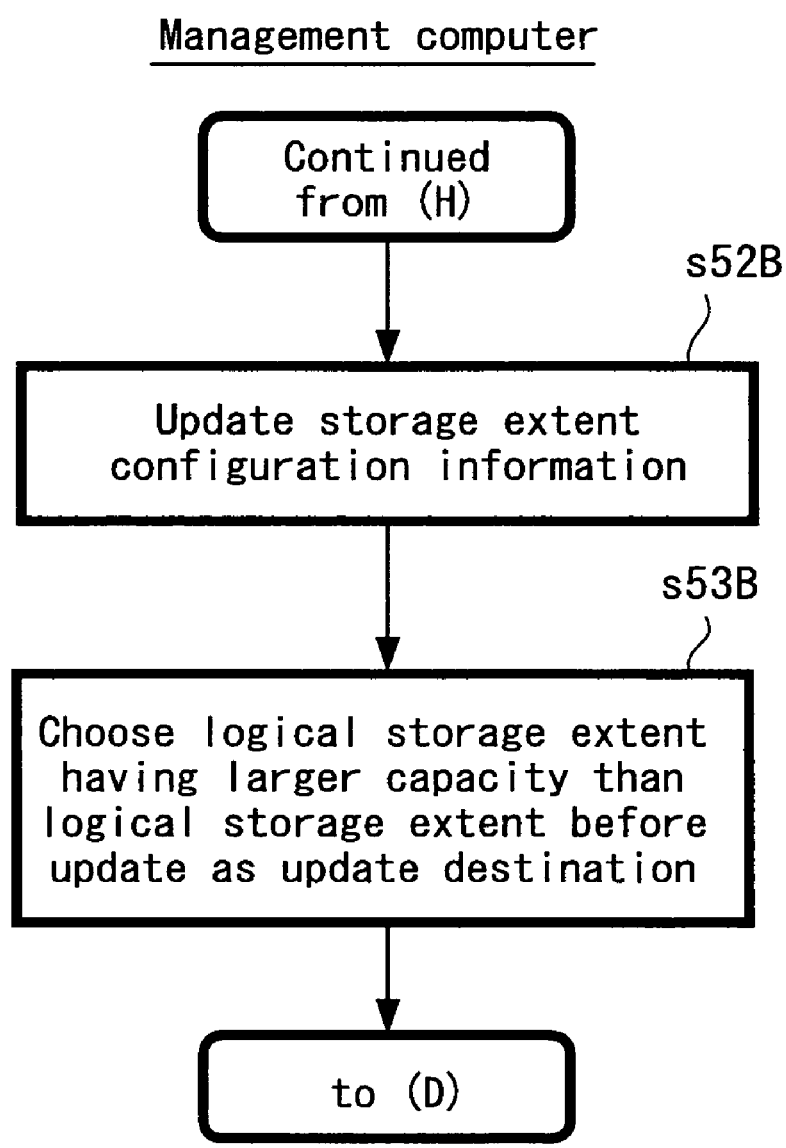
FIG. 22 is a flow chart showing update processing of encryption method using a technology of virtual storage extent management according to the present invention.

FIG. 21 and FIG. 22 are flow charts of update processing of an encryption method using the technology of the virtual storage extent management. This flow chart is an example showing a case where a logical storage extent is transferred between storage systems 100 and update processing of an encryption method is performed. First, the virtual storage extent management program 1106 provided in the storage system 100 makes the host computer 200 recognize only a virtual storage extent of the storage system 100. Then, the storage system 100 executes access to the logical storage extent associated with the virtual storage extent by making access to this recognized virtual storage extent from the host computer 200. Thereby, the migration method of encrypted data and the update method of an encryption method are achieved. It should be noted that these methods can be a substitute of the method of updating into the encrypted data by the other encryption method of FIG. 16.

Although each processing shown in FIG. 21 and FIG. 22 is almost similar to each processing shown in FIG. 19 and FIG. 20, there is a difference in a point where the storage system 100 after update is provided with both the encryption method before update and the encryption method after update in step s45B of FIG. 21. Furthermore, at a point of time that step s53B of FIG. 22 is completed, there becomes such a state that a logical storage extent 120 before update mounted on another storage system 100 is associated as a virtual storage extent within the storage system 100 provided with the encryption methods before and after update. More specifically, there becomes such a configuration that both of the logical storage extent 120 recorded by the encryption method before update and the logical storage extent 120 to be recorded by the encryption method after update exist within a single apparatus. This configuration makes it possible to create the logical storage extent 120 having the encryption method updated by continuing thereafter processing starting from (D) of FIG. 17.

Figure 23:
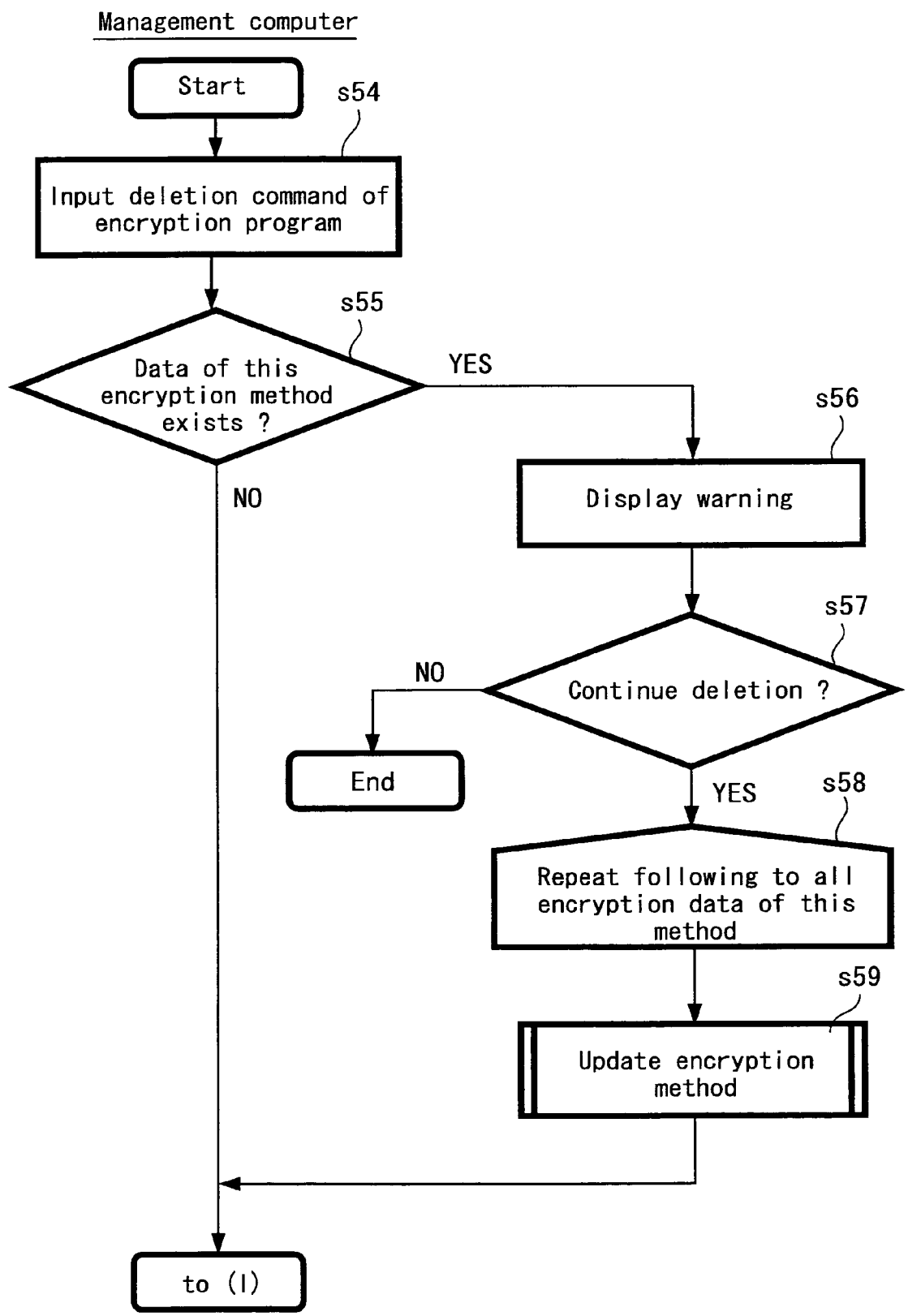
FIG. 23 is a flow chart showing processing of deleting an encryption program according to the present invention.
Figure 24:
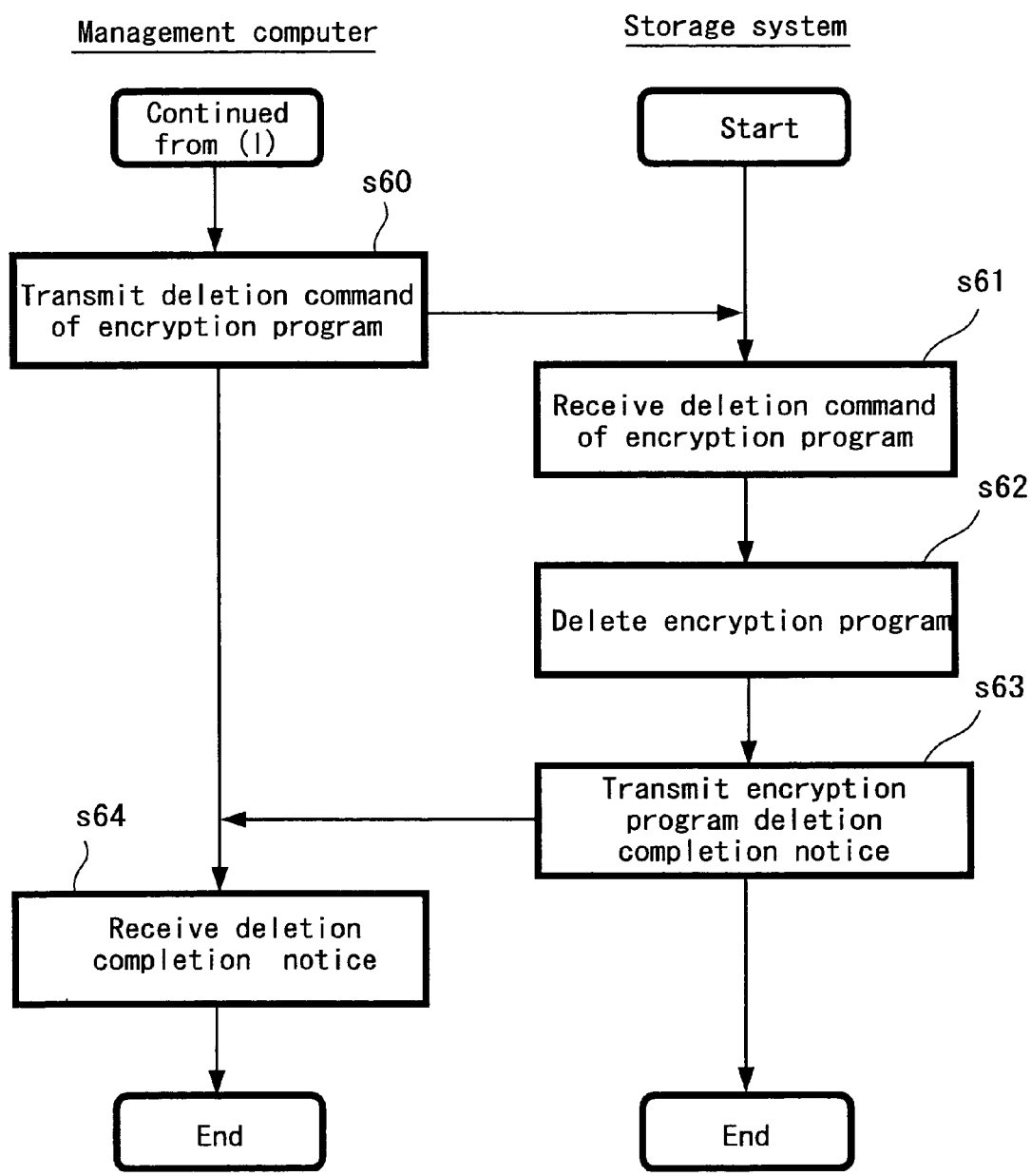
FIG. 24 is a flow chart showing processing of deleting an encryption program according to the present invention.

FIG. 23 and FIG. 24 are flow charts showing a processing procedure to delete the encryption program 1101.

In FIG. 23, an operator of the management computer 300 inputs a deletion command of the encryption program 1101 mounted on the storage system 100 from the input interface 370 (step s54). At this time, the operator had better make it possible to choose the encryption method 31022 which is to be deleted by output information recorded in the asset management information 3102 from the management computer 300 through the output interface 380. Next, the asset management program 3101 retrieves the data encryption management information 3105, and judges whether data encrypted by the encryption method inputted in step s54 is held within the storage system 100 identified by the apparatus identification information 31055 (step s55). For example, it is assumed that a deletion command of an encryption method of a "first encryption algorithm" is inputted in step s54 by the operator from an apparatus "50:00:01:E8:A0:C3:B0" shown in the example of FIG. 9. Then, the asset management program 3101 retrieves the data encryption management information 3105 shown in the example of FIG. 10, and judges whether a logical storage extent 120 encrypted by the "first encryption algorithm" exists within this apparatus. In this embodiment, since logical storage extents "00:01" and "00:02" encrypted by the "first encryption algorithm" exist within the apparatus "50:00:01:E8:A0:C3: B0" in case of FIG. 10, a result of judgment in step s55 becomes YES.

When this result is YES, there occurs such a problem that the data thereof can not be decrypted if this data encryption program 1101 is deleted. Accordingly, the asset management program 3101 gives a warning on an operation screen from the output interface 380, and urges an input whether to continue the deletion processing (step s56). When the continuation of the deletion processing is requested in this input (YES in step s57), the asset management program 3101 repeats the update processing of the encryption method to all logical storage extents 120 recorded by this encryption method (step s58). The above-described method shown in FIG. 16, FIG. 17 and FIG. 18 or shown in FIG. 21 may be used as this update processing of the encryption method (step s59). Since the logical storage extent 120 encrypted by the data encryption program 1101 of the deletion object inputted in step s54 disappears as the result of those update processing, the problem does not occur even if this data encryption program 1101 is deleted.

Furthermore, the asset management program 3101 transmits a deletion command of the data encryption program 1101 inputted in step s54 to the storage system 100 in FIG. 24 (step s60). The storage system 100 receives the deletion command message through the management information I/O program 1110 (step s61). The program install management program 1108 provided in the storage system 100 deletes the requested data encryption program 1101 from the program memory 110 (step s62). When the deletion is succeeded, the program install management program 1108 updates in such a manner that information relating to this program is deleted from the program management information 1109. When the deletion is completed, the storage system 100 transmits a deletion completion notice of the data encryption program 1101 to the management computer 300 (step s63). The management computer 300 receives this notice (step s64). The management computer 300 updates in such a manner that information relating to this program is deleted from the asset management information 3102.

By the above-described processing, it becomes possible to urge an interruption by giving a warning to a deletion from the management computer 300 even when the operator tries to delete the data encryption program 1101, and to avoid such a risk that there remains data which is unable to decrypt since the encrypted data by this encryption method is updated and kept into encrypted data by another encryption method.

Hereinafter, a specific processing procedure in the above-described embodiment is shown when the information shown in FIG. 6 through FIG. 12 is used especially as an example.

First, a system administrator tries to migration the logical storage extent 120 identified by "00:02" (the third line of FIG. 11), which is stored on the storage system 100 identified by "50:00:01:E8:A0:C3:B0", to another storage system 100 (step s1 in FIG. 13). When the data encryption management information 3105 is referred (the third line of FIG. 10) in order to judge whether this logical storage extent 120 is encrypted data, it is noticed that this is the data encrypted by the "first encryption algorithm" (step s2 in FIG. 13). Next, the management computer 300 refers to the asset management information 3102, and it is noticed that the "first encryption algorithm" is mounted on the storage system 100 identified by "50:00:01:1E:0A:E8:02" provided with this encryption method (the third line of FIG. 9). Then, this apparatus is adopted as the migration destination (step s3 in FIG. 13). The management computer 300 retrieves the storage extent configuration information 3107, and since the capacity of the logical storage extent 120 in step s1 is 20 GB (the third line of FIG. 11), the logical storage extent 120 of the same capacity identified by "05:02" (the eighth line of FIG. 11) is adopted as the migration destination (step s5 in FIG. 13).

Thereafter, the data is replicated from the migration source to the logical storage extent 120 of the migration destination by the above-described procedure (steps s6 through s11 in FIG. 14), furthermore the logical storage extent 120 of the migration source is deleted, and the processing is ended (steps s13 through s18 in FIG. 15).

Although the logical storage extent "00:02" mounted on "50:00:01:E8:A0:C3: B0" is migrated to "05:02" mounted on "50:00:01:1E:0A:E8:02" by the above-described processing, there occurs no problem in continuing input/output of encrypted data because the apparatus after migration is also provided with the "first encryption algorithm" similarly to the migration source.

Next, the system administrator tries to update the encryption method of the logical storage extent "05:02" of "50:00: 01:1E:0A:E8:02" which was the migration destination in the above example (step s20 in FIG. 16). In addition, a "second encryption algorithm" is specified as an encryption method which is newly applied after update (step s21 in FIG. 16). The management computer 300 retrieves the asset management information 3102, and confirms that the "second encryption algorithm" (the fourth line of FIG. 9) is mounted on this apparatus (step s22 in FIG. 16). Furthermore, the storage extent configuration information 3107 is referred to, and since the capacity of "05:02" is 20 GB, "06:01" having larger capacity (the ninth line of FIG. 11) is adopted as the update destination (step s26 in FIG. 16).

Thereafter, the processing of updating the encryption method from the update source to the logical storage extent 120 of the update destination is performed by the above-described procedure (from step s27 in FIG. 17 to step s35 in FIG. 18), furthermore the logical storage extent 120 of the update source is deleted, and the processing is ended (from step s36 to step s41 in FIG. 18).

Following shows an example in which the encryption method is updated using the virtual storage extent management.

It is assumed that the system administrator inputs "00:01" mounted on "50:00:01:E8:A0:C3:B0" as the logical storage extent 120 to which the encryption method is updated (step s43B in FIG. 21). Furthermore, the "second encryption algorithm" is specified as the encryption method which is newly applied after update (step s44B in FIG. 21). When the data encryption management information 3105 is referred to, it is noticed that this logical storage extent "00:01" is encrypted by the "first encryption algorithm" (the second line of FIG. 10). Then, the asset management information 3102 is referred to, and "50:00:01:1E:0A:E8:02" mounting the "first encryption algorithm" and the "second encryption algorithm" is adopted as the storage system 100 of the update destination (step s45B in FIG. 21). The management computer 300 requests this "00:01" to be associated as the virtual storage extent on "50:00:01:1E:0A:E8:02" (step s46B in FIG. 21). "50:00:01:1E:0A:E8:02" receives this request (step s47B in FIG. 21), and associate this "00:01" with the virtual storage extent. FIG. 11 shows an example in which the logical storage extent having the identification number of "05:01" (the seventh line of FIG. 11) is associated within "50:00:01:1E:0A: 1E:0A:E8:02" as the virtual storage extent of "00:01" provided within the above-described "50:00:01:E8:A0:C3:B0". Thereafter, it is only necessary that "05:02" or "06:01" is adopted as the logical storage extent 120 of the update destination (step s53B in FIG. 22) and the update processing is continued similarly to the above-described example.

According to the method which uses this virtual storage extent management, it is possible to obtain such an effect that the update processing of the encryption method directly aiming at the logical storage extent 120 on another storage system 100 can be performed without performing the data migration processing shown in FIG. 13, FIG. 14 and FIG. 15.

Figure 25:
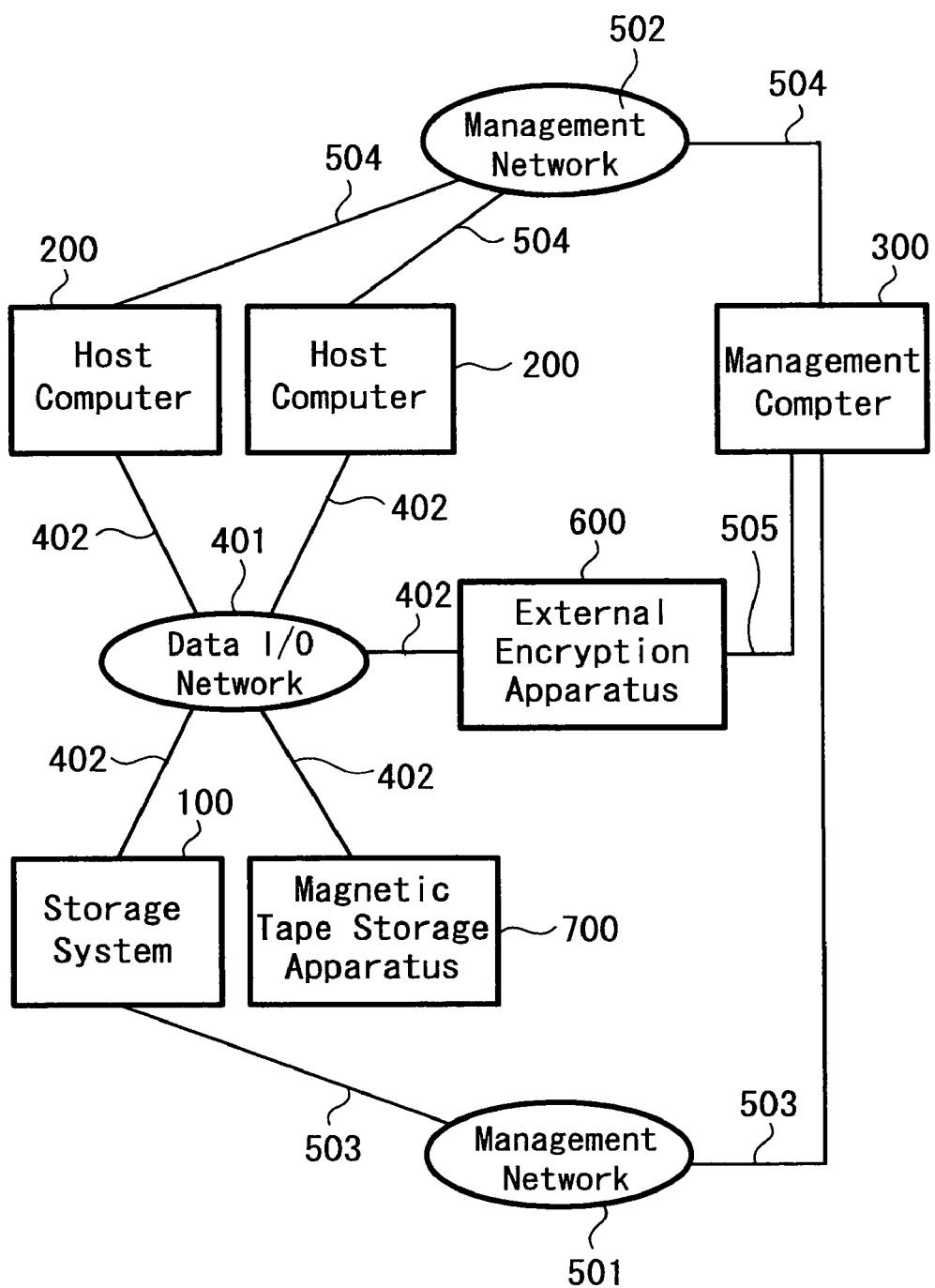
FIG. 25 is an outline diagram showing a configuration example of another network according to the present invention.

Next, a configuration diagram in another embodiment of the present invention is shown in FIG. 25. This configuration is an example in which an external encryption apparatus 600 and a magnetic tape storage apparatus 700 are added besides the configuration example of FIG. 1. This configuration makes it possible to encrypt data to be stored and to decrypt data to be read out by having input-output data once pass through the external encryption apparatus 600 when a host computer 200 reads and writes the data to the magnetic tape storage apparatus 700.

Figure 26:
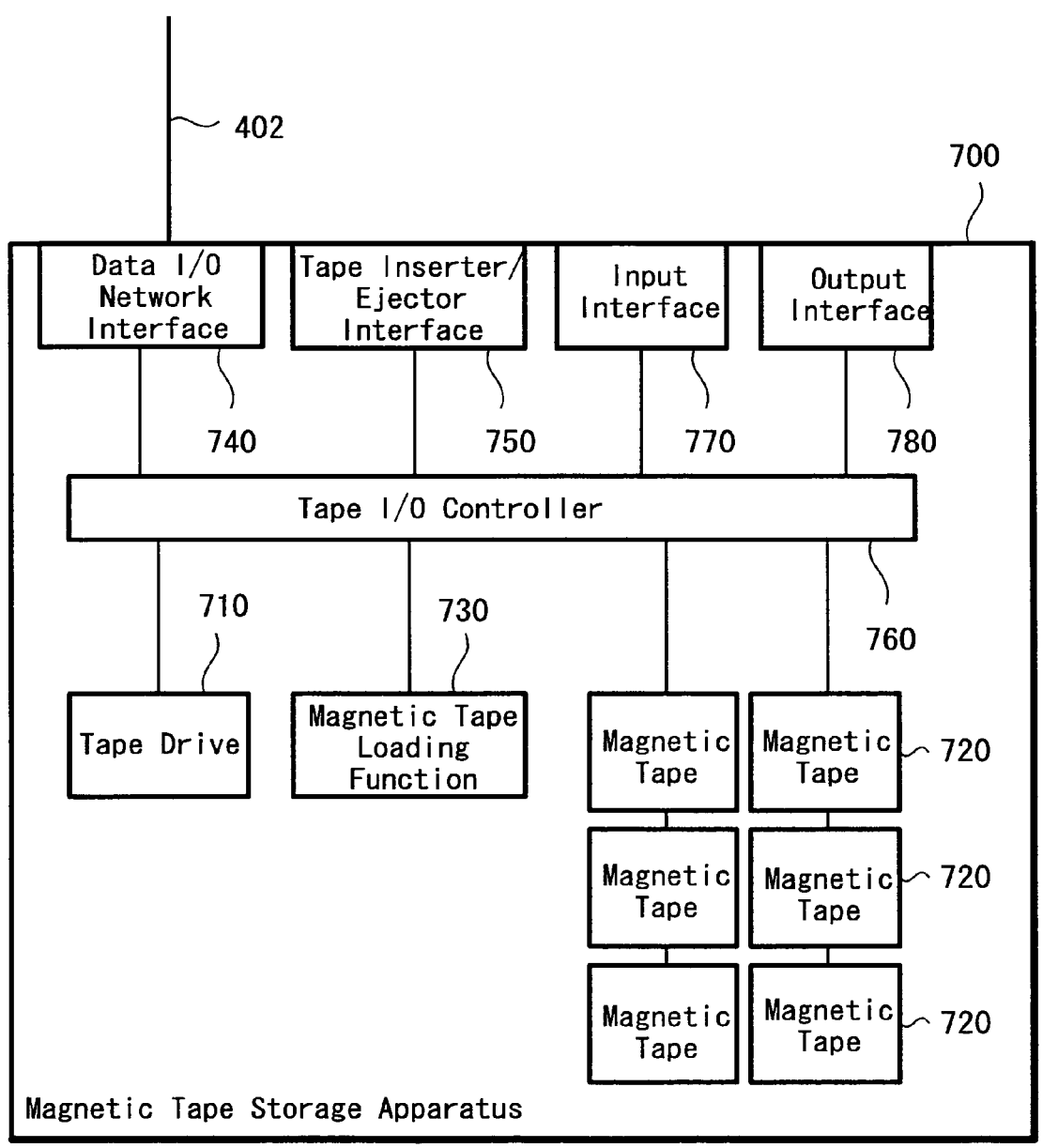
FIG. 26 is a configuration example of a magnetic tape storage apparatus according to the present invention.

FIG. 26 shows a configuration example of the magnetic tape storage apparatus 700. The magnetic tape storage apparatus 700 is configured to have one or more magnetic tapes 720, a magnetic tape loading function 730 to insert or extract the magnetic tape 720 into/from a tape drive, a tape drive 710 to read and write data to the loaded magnetic tape 720, a tape inserter/ejector interface 750 which is an interface for detaching the magnetic tape 720 from a case and loading a new magnetic tape into the case, a data I/O network interface 740, an input interface 770, and an output interface 780, which are connected by a tape I/O controller 760.

The magnetic tape storage apparatus 700 reads out data requested by the host computer 200 from the tape drive and outputs through the data I/O network interface 740, and stores data on the magnetic tape 720 by loading the magnetic tape 720 for input and output into the tape drive using the magnetic tape loading function 730, for example.

Figure 27:
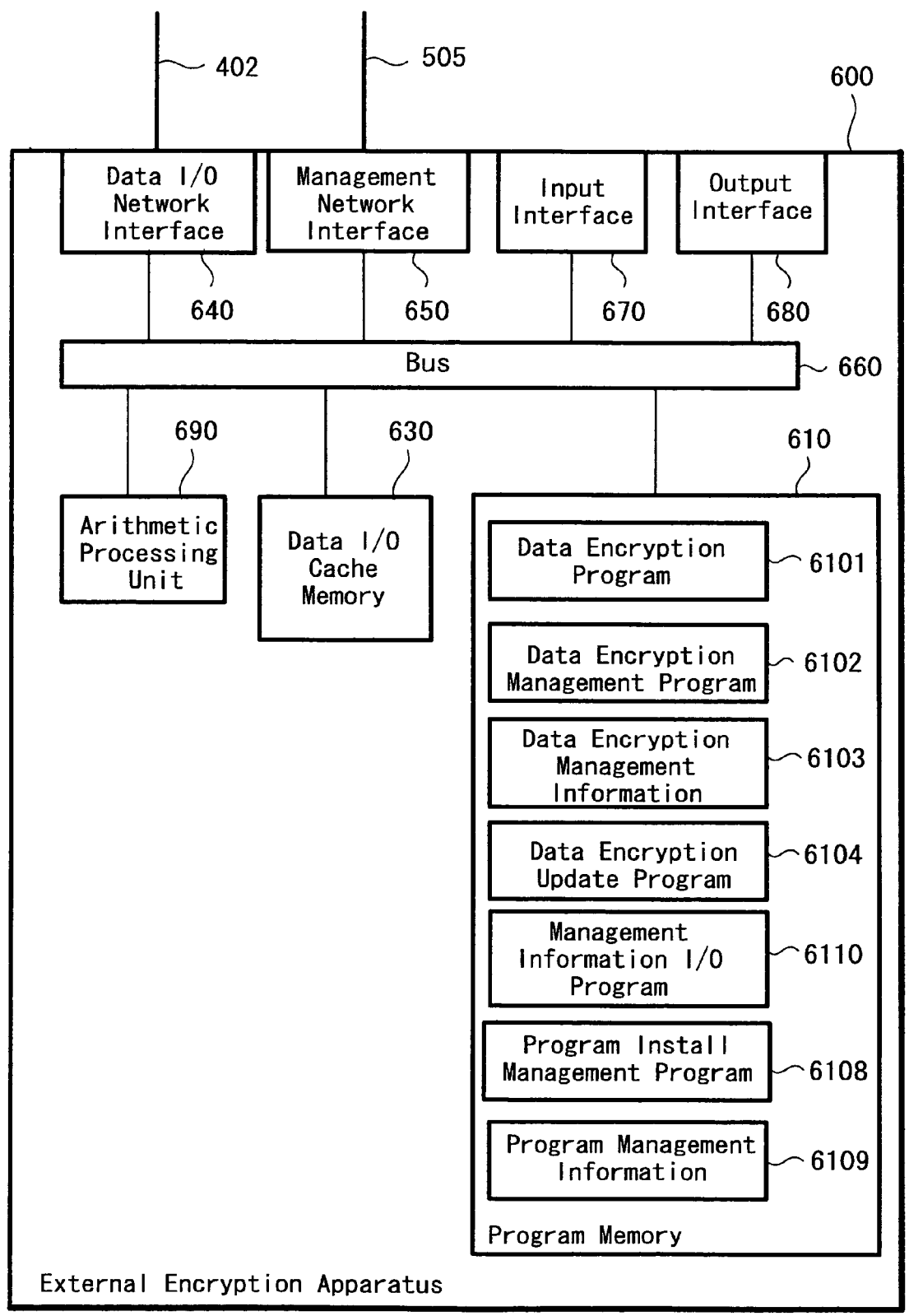
FIG. 27 is a configuration example of an external encryption apparatus according to the present invention.

FIG. 27 shows a configuration example of the external encryption apparatus 600. The external encryption apparatus 600 has a configuration in which the logical storage extent 120, the virtual storage extent management program 1106 and the like are omitted from the configuration of the storage system 100 shown in FIG. 3. When the host computer 200 commands the external encryption apparatus 600 to output data, the external encryption apparatus 600 reads out data from the magnetic tape storage apparatus 700, stores the data on a cache memory 630, decrypts this by a data encryption program 6101, and supplies this data to the host computer 200. Write-in from the host computer 200 is also performed similarly in such a manner that the external encryption apparatus 600 once encrypts input data and the encrypted data is written in the magnetic tape 720.

FIG. 28 is one example of the data encryption management information 3105 maintained by the management computer 300 in the present embodiment. Magnetic tape identification information 31051 is written instead of the logical storage extent identification information 31051 according to the data encryption management information 3105 of the present embodiment. Identification information on the external encryption apparatus 600 is written in the apparatus identification information 31055. By having this configuration, it becomes possible to access the magnetic tape 720 which is a management object of the external encryption apparatus 600 and the data encryption program 6101 thereof.

It should be noted that data encryption management information 6103 held in the external encryption apparatus 600 also similarly stores the magnetic tape identification information instead of the logical storage extent identification information.

The deletion procedure of the data encryption program 6101 shown in FIG. 23 and FIG. 24 can be also applied in the present embodiment.

Furthermore, in case of the present embodiment, it is also possible to use such that the system administrator inquires the management computer 300 whether it is OK to remove the external encryption apparatus 600. For example, it is assumed that an asset administrator inquires the management computer 300 whether it is OK to remove the external encryption apparatus 600 in FIG. 23 (step s54). The asset management program 3101 judges whether there exists a magnetic tape 720 storing data encrypted by an encryption method mounted only on this external encryption apparatus 600 (step s55). When a result of judgment thereof is YES, the asset management program 3101 displays a warning message and urges not to remove this external encryption apparatus 600 (step s56). When there is still a request for continuing the removal (step s57), the encryption method of the data recorded on the magnetic tape 720 is updated into another method (step s58 and step s59). At this time, such one that compatible data encryption program 1101 is mounted on another apparatus is adopted as the encryption method after update. In the present embodiment, the processing is ended here without performing the processing from step s60 onward shown in FIG. 24. Since the magnetic tape 720 encrypted by this external encryption apparatus 600 does not remain by the processing up to this point, it is assured that a problem does not occur even if this encryption apparatus is removed.

More specific procedure of removal judgment processing of an encryption apparatus according to the present embodiment is explained.

It is assumed that the system administrator has inputted a removal of an external encryption apparatus "30:00:12:C0:0A:1C:32" (step s54 in FIG. 23). The management computer 300 refers to the data encryption management information 3105, and it is examined that magnetic tapes "Label__0001" and "Label__0002" managed by this apparatus are encrypted by the "first encryption algorithm" (step s55 in FIG. 23). Then, a risk of not being able to decrypt the magnetic tape 720 stored by this encryption method is eliminated by giving a warning to urge an interruption of the removal (steps s56 and s57 in FIG. 23), performing processing of updating "Label__0001" and "Label__0002" into other magnetic tapes by using the latest encryption method (step s59), and so on. Since the external encryption apparatus "30:00:12:C0:0A:1C:32" is removed thereafter (step s60 through step s64 in FIG. 24), there does not occur such a problem that encrypted data which can not be decrypted remains after removal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A computer system comprising:
a first storage system coupled to a computer;
a second storage system coupled to the first storage system; and
a management computer coupled to the first storage system and the second storage system,
wherein the first storage system comprises:
 a plurality of first volumes that stores data accessed by the computer;
 a first control unit which controls the plurality of first volumes based on access from the computer; and
 a first data encryption module which encrypts or decrypts data stored on one of the plurality of first volumes based on a first encryption method;
wherein the second storage system comprises:
 a plurality of second volumes that stores data accessed by the computer;
 a second control unit which controls the plurality of second volumes based on access from the computer; and
 a second data encryption module which encrypts or decrypts data stored on one of the plurality of second volumes based on a second encryption method,
wherein the management computer comprises a memory that stores encryption method compatibility information which indicates compatibility between a plurality of encryption methods including the first encryption method and the second encryption method,
wherein when the management computer receives a migration instruction of data migration of encrypted data stored in one of the plurality of first volumes, the management computer searches the encryption method compatibility information for an encryption method which has compatibility with the first encryption method used in the first data encryption module included in the first storage system, and
wherein when the second encryption method which is used in the second data encryption module included in the second storage system is compatible with the first encryption method, the management computer selects the second storage system as a destination of the data migration, and instructs to migrate the encrypted data stored in the one of the plurality of first volumes, for which the migration instruction was received, to one of the plurality of second volumes.

2. A computer system according to claim 1,
wherein the first storage system includes a first memory configured to temporarily store encrypted data which is stored on one of the plurality of first volumes, wherein the first control unit updates the first encryption method of the first data encryption module corresponding to one of the plurality of first volumes in which encrypted data is stored from the first encryption method to the second encryption method, wherein encrypted data to be stored on one of the plurality of first volumes is temporarily store stored in the first memory, wherein the encrypted data is decrypted within the first memory by the first data encryption module, and wherein, after the decrypted data is encrypted again based on the second encryption method of the second data encryption module which has been updated, the data is written in the one of the plurality of first volumes.

3. A computer system according to claim 1, wherein the second control unit creates a virtual volume within the second storage system, and associates one of the plurality of first volumes in which encrypted data is stored, with the virtual volume, and wherein after the second control unit associates the virtual volume with the one of the plurality of first volumes in which encrypted data is stored, the management computer instructs to migrate the encrypted data stored in the one of the plurality of first volumes to one of the plurality of second volumes.

4. A data migration method in a computer system, the computer system comprising a first storage system coupled to a computer, a second storage system coupled to the first storage system, and a management computer coupled to the first storage system and the second storage system, wherein the first storage system comprises a plurality of first volumes, a first control unit, and a first data encryption module, wherein the second storage system comprises a plurality of second volumes, a second control unit, and a second data encryption module, and wherein the management computer comprises a memory, the data migration method comprising:

storing data accessed by the computer in the plurality of first volumes;

controlling, by the first control unit, the plurality of first volumes based on access from the computer;

encrypting or decrypting, by the first data encryption module, data stored on one of the plurality of first volumes based on a first encryption method;

storing data accessed by the computer in the plurality of second volumes;

controlling, by the second control unit, the plurality of second volumes based on access from the computer;

encrypting or decrypting, by the second data encryption module, data stored on one of the plurality of second volumes based on a second encryption method;

storing encryption method compatibility information which indicates compatibility between a plurality of encryption methods including the first encryption method and the second encryption method in the memory of the management computer;

when the management computer receives a migration instruction of data migration of encrypted data stored in one of the plurality of first volumes, searching, by the management computer, the encryption method compatibility information for an encryption method which has compatibility with the first encryption method used in the first data encryption module included in the first storage system; and when the second encryption method which is used in the second data encryption module included in the second storage system is compatible with the first encryption method, selecting, by the management computer, the second storage system as a destination of the data migration, and instructing, by the management computer, to migrate the encrypted data stored in the one of the plurality of first volumes, for which the migration instruction was received, to one of the plurality of second volumes.

5. A data migration method according to claim 4, wherein the data migration is executed between storage systems as a migration from one of the plurality first volumes of the first storage system to one of the plurality of second volumes of the second storage system.

6. A data migration method according to claim 4, wherein the data migration is a migration from a first one of the plurality of first volumes of the first storage system to a second one of the plurality of first volumes of the first storage system, or from a first one of the plurality of second volumes of the second storage system to a second one of the plurality of second volumes of the second storage system.

7. A data migration method according to claim 4, wherein the first storage system includes a first memory that temporarily stores encrypted data stored on one of the plurality of first volumes;

wherein the encrypted data is decrypted within the first memory;

wherein the decrypted data decrypted by the second encryption method having the first encryption method updated is encrypted again based on the second encryption method; and wherein the encrypted data is then written in one of the plurality of first volumes.

8. A data migration method according to claim 7, further comprising:

creating a virtual volume within the second storage system, and associating one of the plurality of first volumes in which encrypted data is stored, with the virtual volume; and after the virtual volume is associated with the one of the plurality of first volumes in which encrypted data is stored, instructing to migrate the encrypted data stored in the one of the plurality of first volumes to one of the plurality of second volumes.

9. A data migration method according to claim 4, further comprising:

at the time of deleting data encryption processing based on the first encryption method which handles encryption processing and decryption processing of encrypted data, investigating an influence arisen from the deletion of the data encryption processing based on the first encryption method; and when there exists encrypted data which cannot be decrypted due to the deletion of the data encryption processing based on the first encryption method, providing a warning regarding the deletion of the data encryption processing based on the first encryption method in order to urge an interruption of the deletion processing.

10. A data migration method according to claim 9, further comprising:

before deleting the data encryption processing based on the first encryption method, as to a volume having the encrypted data which cannot be decrypted after deleting the data encryption processing based on the first encryption method, rewriting the encrypted data into encrypted data encrypted by the second encryption method by converting the data encrypted by the data encryption processing based on the first encryption method into data encrypted by data encryption processing based on the second encryption method.

11. A management computer coupled to a first storage system and a second storage system, the first storage system having a first volume and a first data encryption module which encrypts or decrypts data stored on the first volume based on a first encryption method, and the second storage system having a second volume and a second data encryption module which encrypts or decrypts data stored on the second volume based on a second encryption method, wherein the management computer comprises:

- a memory that stores encryption method compatibility information which indicates compatibility between a plurality of encryption methods including the first encryption method and the second encryption method;
- a judgment means for determining the compatibility between the first encryption method, which corresponds to the first volume of the first storage system, and the second encryption method, which corresponds to the second volume of the second storage system, wherein when the management computer receives a migration instruction of data migration of encrypted data stored in the first volume, the management computer searches the encryption method compatibility information for an encryption method which has compatibility with the first encryption method used in the first data encryption module included in the first storage system, and wherein when the second encryption method which is used in the second storage system is compatible with the first encryption method, the management computer selects the second storage system as a destination of the data migration, and instructs to migrate the encrypted data stored in the first volume, for which the migration instruction was received, to the second volume.

12. A management computer according to claim 11, further comprising:

- a retrieval means for retrieving the second volume corresponding to the second encryption method which is compatible with the first encryption method corresponding to the first volume and which is capable of decrypting data encrypted by the first encryption method corresponding to the first volume in order to migrate encrypted data stored on the first volume to the second volume based on volume configuration information stored in a volume configuration information memory means; and
- an update command means for providing a command to update the second encryption method corresponding to the second volume which becomes the data migration destination in accordance with a result of retrieval by the retrieval means.

13. A management computer according to claim 11, wherein at the time of removing the first encryption method for performing encryption processing and decryption processing of encrypted data, an influence arisen from the removal of the first encryption method is investigated, and wherein when there exists encrypted data which cannot be decrypted due to the removal of the first encryption method, a warning regarding the removal of the first encryption method is provided to urge an interruption of the removal processing.

14. A management computer according to claim 13, wherein prior to the removal of the first encryption method, as to a volume having encrypted data which cannot be decrypted after removal of the first encryption method, the encrypted data is re-written into encrypted data encrypted by another encryption method by converting the data encrypted by the first encryption method into data encrypted by the another encryption method.

15. A management computer according to claim 13, wherein the investigation of the influence arisen from the removal of the first encryption method is made based on asset management information relating to a data encryption method for a volume.

* * * * *